US008827798B2

(12) United States Patent
Nicely

(10) Patent No.: US 8,827,798 B2
(45) Date of Patent: *Sep. 9, 2014

(54) GAMING SYSTEM AND METHOD PROVIDING A USER DEVICE THAT RECEIVES AND STORES REEL SETS FOR SUBSEQUENT GAME PLAYS

(75) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,054

(22) Filed: Sep. 28, 2011

(65) Prior Publication Data

US 2013/0079100 A1 Mar. 28, 2013

(51) Int. Cl.
*A63F 9/24* (2006.01)
*A63F 13/00* (2014.01)
*G07F 17/34* (2006.01)

(52) U.S. Cl.
CPC .................................... *G07F 17/34* (2013.01)
USPC .................. 463/21; 463/20; 463/22; 463/42; 463/43

(58) Field of Classification Search
None
See application file for complete search history.

(56) References Cited

U.S. PATENT DOCUMENTS 4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,527,798 A 7/1985 Siekierski et al.
4,560,161 A 12/1985 Hamano
4,582,324 A 4/1986 Koza et al.
4,624,462 A 11/1986 Itkis
4,636,951 A 1/1987 Harlick
4,652,998 A 3/1987 Koza et al.
4,669,730 A 6/1987 Small
4,679,143 A 7/1987 Hagiwara
4,689,742 A 8/1987 Troy et al.
4,798,387 A 1/1989 Richardson (Continued)

FOREIGN PATENT DOCUMENTS

GB 2 374 294 A 10/2002
WO WO 00/67424 A1 11/2000
WO WO 02/097749 A2 12/2002

*Primary Examiner* — Steven J Hylinski
(74) *Attorney, Agent, or Firm* — Neal, Gerber & Eisenberg LLP

(57) ABSTRACT

System and method providing reel sets for subsequent plays. A user playing a user device wagers a wager amount on a play of a game. The user device displays a base reel set spinning. A server determines an outcome for the current play and a second reel set for the next play of that game on which the user wagers that same wager amount. The server communicates second reel set data and outcome data to the user device. The reels are stopped in accordance with the determined outcome. When the user wagers that same wager amount on another play of that game, the user device displays the second play of that game using the second reel set, the server determines a third reel set for the next play of that game on which the user wagers that same wager amount, and communicates third reel set data to the user device.

24 Claims, 16 Drawing Sheets

130

| Wagering Game (132) | Wager Amount (134) | Reel Set (136) Current Play (136a) | Reel Set Next Play (136b) |
|---|---|---|---|
| 132a 1 | 134a 1 | 141a BASE 1 (151a) | 142a ALTERNATE 1A (152a) |
| | 134b 2 | 141b | 142b |
| | 134c 3 | 141c | 142c |
| 132b 2 | 134a 1 | 141d | 142d |
| | 134b 2 | 141e | 142e |
| | 134c 3 | 141f | 142f |
| 132c 3 | 134a 1 | 141g | 142g |
| | 134b 2 | 141h | 142h |
| | 134c 3 | 141i | 142i |

(56) References Cited

U.S. PATENT DOCUMENTS

| | | | | |
|---|---|---|---|---|
| 4,805,907 | A | 2/1989 | Hagiwara | |
| 4,815,741 | A | 3/1989 | Small | |
| 4,817,951 | A | 4/1989 | Crouch et al. | |
| 4,842,278 | A | 6/1989 | Markowicz | |
| 4,848,771 | A | 7/1989 | Richardson | |
| 4,856,787 | A | 8/1989 | Itkis | |
| 4,880,237 | A | 11/1989 | Kishishita | |
| 4,882,473 | A | 11/1989 | Bergeron et al. | |
| 4,982,337 | A | 1/1991 | Burr et al. | |
| 5,007,649 | A | 4/1991 | Richardson | |
| 5,042,809 | A | 8/1991 | Richardson | |
| 5,085,436 | A * | 2/1992 | Bennett | 463/21 |
| 5,092,598 | A | 3/1992 | Kamille | |
| 5,100,139 | A | 3/1992 | Di Bella | |
| 5,102,134 | A * | 4/1992 | Smyth | 463/21 |
| 5,119,295 | A | 6/1992 | Kapur | |
| 5,154,421 | A * | 10/1992 | Hamano | 463/21 |
| 5,158,293 | A | 10/1992 | Mullins | |
| 5,223,698 | A | 6/1993 | Kapur | |
| 5,265,874 | A | 11/1993 | Dickinson et al. | |
| 5,275,400 | A | 1/1994 | Weingardt et al. | |
| 5,276,312 | A | 1/1994 | McCarthy | |
| 5,282,620 | A | 2/1994 | Keesee | |
| 5,297,802 | A | 3/1994 | Pocock et al. | |
| 5,324,035 | A | 6/1994 | Morris et al. | |
| 5,326,104 | A | 7/1994 | Pease et al. | |
| 5,348,299 | A | 9/1994 | Clapper, Jr. | |
| 5,351,970 | A | 10/1994 | Fioretti | |
| 5,377,975 | A | 1/1995 | Clapper, Jr. | |
| 5,393,057 | A | 2/1995 | Marnell | |
| 5,393,061 | A | 2/1995 | Manship et al. | |
| 5,398,932 | A | 3/1995 | Eberhardt et al. | |
| 5,407,199 | A | 4/1995 | Gumina | |
| 5,476,259 | A | 12/1995 | Weingardt | |
| 5,487,544 | A | 1/1996 | Clapper, Jr. | |
| 5,536,008 | A | 7/1996 | Clapper, Jr. | |
| 5,542,669 | A | 8/1996 | Charron et al. | |
| 5,562,284 | A | 10/1996 | Stevens | |
| 5,564,701 | A | 10/1996 | Dettor | |
| 5,580,311 | A | 12/1996 | Haste, III | |
| 5,586,937 | A | 12/1996 | Menashe | |
| 5,595,538 | A | 1/1997 | Haste, III | |
| 5,609,337 | A | 3/1997 | Clapper, Jr. | |
| 5,628,684 | A | 5/1997 | Bouedec | |
| 5,630,754 | A | 5/1997 | Rebane | |
| 5,639,088 | A | 6/1997 | Schneider et al. | |
| 5,645,485 | A | 7/1997 | Clapper, Jr. | |
| 5,657,899 | A | 8/1997 | Stoken | |
| 5,674,128 | A | 10/1997 | Holch et al. | |
| 5,697,843 | A | 12/1997 | Manship et al. | |
| 5,720,483 | A | 2/1998 | Trinh | |
| 5,735,432 | A | 4/1998 | Stoken et al. | |
| 5,749,784 | A | 5/1998 | Clapper, Jr. | |
| 5,779,545 | A | 7/1998 | Berg et al. | |
| 5,779,547 | A | 7/1998 | SoRelle et al. | |
| 5,800,269 | A | 9/1998 | Holch et al. | |
| 5,810,664 | A | 9/1998 | Clapper, Jr. | |
| 5,830,067 | A | 11/1998 | Graves et al. | |
| 5,833,538 | A * | 11/1998 | Weiss | 463/21 |
| 5,855,515 | A | 1/1999 | Pease et al. | |
| 5,871,398 | A | 2/1999 | Schneier et al. | |
| 5,876,283 | A | 3/1999 | Parra et al. | |
| 5,882,260 | A | 3/1999 | Marks et al. | |
| 5,915,588 | A | 6/1999 | Stoken et al. | |
| 5,928,082 | A | 7/1999 | Clapper, Jr. | |
| 5,941,771 | A | 8/1999 | Haste, III | |
| 5,944,606 | A | 8/1999 | Gerow | |
| 5,949,042 | A | 9/1999 | Dietz, II et al. | |
| 5,954,582 | A | 9/1999 | Zach | |
| 5,970,143 | A | 10/1999 | Schneier et al. | |
| 5,980,385 | A | 11/1999 | Clapper, Jr. | |
| 5,984,779 | A | 11/1999 | Bridgeman et al. | |
| 6,012,984 | A | 1/2000 | Roseman | |
| 6,017,032 | A | 1/2000 | Grippo et al. | |
| 6,024,640 | A | 2/2000 | Walker et al. | |
| 6,056,289 | A | 5/2000 | Clapper, Jr. | |
| 6,062,981 | A | 5/2000 | Luciano, Jr. | |
| 6,079,711 | A | 6/2000 | Wei et al. | |
| 6,089,982 | A | 7/2000 | Holch et al. | |
| 6,093,100 | A | 7/2000 | Singer et al. | |
| 6,099,408 | A | 8/2000 | Schneier et al. | |
| 6,117,009 | A | 9/2000 | Yoseloff | |
| 6,120,024 | A | 9/2000 | Lind | |
| 6,132,311 | A | 10/2000 | Williams | |
| 6,146,271 | A | 11/2000 | Kadlic | |
| 6,146,272 | A | 11/2000 | Walker et al. | |
| 6,149,521 | A | 11/2000 | Sanduski | |
| 6,155,925 | A | 12/2000 | Giobbi et al. | |
| 6,159,095 | A | 12/2000 | Frohm et al. | |
| 6,168,521 | B1 | 1/2001 | Luciano et al. | |
| 6,174,233 | B1 | 1/2001 | Sunaga et al. | |
| 6,183,361 | B1 | 2/2001 | Cummings et al. | |
| 6,190,255 | B1 | 2/2001 | Thomas et al. | |
| 6,210,275 | B1 | 4/2001 | Olsen | |
| 6,210,276 | B1 | 4/2001 | Mullins | |
| 6,217,448 | B1 | 4/2001 | Olsen | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,251,013 | B1 | 6/2001 | Bennett | |
| 6,254,480 | B1 | 7/2001 | Zach | |
| 6,270,412 | B1 * | 8/2001 | Crawford et al. | 463/20 |
| 6,273,820 | B1 | 8/2001 | Haste, III | |
| 6,280,325 | B1 | 8/2001 | Fisk | |
| 6,280,328 | B1 | 8/2001 | Holch et al. | |
| 6,302,791 | B1 | 10/2001 | Frohm et al. | |
| 6,306,038 | B1 | 10/2001 | Graves et al. | |
| 6,309,298 | B1 | 10/2001 | Gerow | |
| 6,315,289 | B1 | 11/2001 | Sakamoto et al. | |
| 6,322,445 | B1 | 11/2001 | Miller | |
| 6,325,716 | B1 | 12/2001 | Walker et al. | |
| 6,358,150 | B1 | 3/2002 | Mir et al. | |
| 6,358,151 | B1 | 3/2002 | Enzminger et al. | |
| 6,368,218 | B2 | 4/2002 | Angell, Jr. | |
| 6,386,977 | B1 | 5/2002 | Hole | |
| 6,394,902 | B1 * | 5/2002 | Glavich et al. | 463/20 |
| 6,402,614 | B1 | 6/2002 | Schneier et al. | |
| 6,419,583 | B1 | 7/2002 | Crumby et al. | |
| 6,425,824 | B1 | 7/2002 | Baerlocher et al. | |
| 6,443,837 | B1 | 9/2002 | Jaffe et al. | |
| 6,447,395 | B1 | 9/2002 | Stevens | |
| 6,450,885 | B2 | 9/2002 | Schneier et al. | |
| 6,454,648 | B1 | 9/2002 | Kelly et al. | |
| RE37,885 | E | 10/2002 | Acres et al. | |
| 6,471,591 | B1 | 10/2002 | Crumby | |
| 6,474,645 | B2 | 11/2002 | Tarantino | |
| 6,475,086 | B2 | 11/2002 | Zach | |
| 6,485,366 | B1 | 11/2002 | Rowe | |
| 6,508,711 | B1 | 1/2003 | Ono | |
| 6,524,184 | B1 | 2/2003 | Lind et al. | |
| 6,524,185 | B2 | 2/2003 | Lind | |
| 6,527,638 | B1 | 3/2003 | Walker et al. | |
| 6,533,664 | B1 | 3/2003 | Crumby | |
| 6,537,150 | B1 | 3/2003 | Luciano et al. | |
| 6,565,092 | B1 | 5/2003 | Mccarthy, Jr. et al. | |
| 6,569,017 | B2 | 5/2003 | Enzminger et al. | |
| 6,599,187 | B2 | 7/2003 | Gerow | |
| 6,607,439 | B2 | 8/2003 | Schneier et al. | |
| 6,609,974 | B2 | 8/2003 | Mead et al. | |
| 6,619,660 | B2 | 9/2003 | Schaefer et al. | |
| 6,656,040 | B1 | 12/2003 | Brosnan et al. | |
| 6,656,044 | B1 | 12/2003 | Lewis | |
| 6,676,126 | B1 | 1/2004 | Walker et al. | |
| 6,685,562 | B1 | 2/2004 | Rantanen | |
| 6,695,695 | B2 | 2/2004 | Angel | |
| 6,729,621 | B2 | 5/2004 | Moody | |
| 6,729,961 | B1 | 5/2004 | Millerschone | |
| 6,733,385 | B1 | 5/2004 | Enzminger et al. | |
| 6,749,500 | B1 | 6/2004 | Nelson et al. | |
| 6,866,584 | B2 | 3/2005 | Michaelson | |
| 6,964,609 | B2 | 11/2005 | Haag et al. | |
| 6,988,946 | B2 | 1/2006 | Michaelson et al. | |
| 7,022,016 | B2 | 4/2006 | Wood et al. | |
| 7,052,395 | B2 * | 5/2006 | Glavich et al. | 463/20 |

(56) References Cited

U.S. PATENT DOCUMENTS 7,192,348 B2 3/2007 Brosnan et al.
7,291,069 B2 11/2007 Michaelson et al.
7,329,183 B2 2/2008 Michaelson et al.
7,387,568 B2 6/2008 Millerschone
7,390,258 B2 6/2008 Millerschone
7,393,276 B2 7/2008 Millerschone
7,399,227 B2 7/2008 Michaelson et al.
7,470,183 B2 12/2008 Wishart
7,524,243 B2 4/2009 Bansemer et al.
7,559,838 B2 7/2009 Walker et al.
7,563,163 B2 7/2009 Crumby
7,658,672 B1 2/2010 Wolf et al.
7,857,693 B1 12/2010 Johnson et al.
7,950,994 B2 * 5/2011 Berman et al. .................. 463/20
8,038,525 B2 * 10/2011 Durham et al. ................. 463/20
8,162,741 B2 4/2012 Wadleigh et al.
8,251,794 B2 * 8/2012 O'Halloran ..................... 463/20
8,388,432 B2 * 3/2013 Mattice et al. .................. 463/20
8,393,953 B2 * 3/2013 Nishimura et al. ............. 463/21
8,602,871 B2 12/2013 Wadleigh et al.
2002/0010013 A1 1/2002 Walker et al.
2002/0014740 A1 * 2/2002 Ainsworth .................... 273/139
2002/0032049 A1 * 3/2002 Walker et al. ................... 463/16
2002/0039917 A1 4/2002 Armstrong et al.
2002/0072404 A1 6/2002 Gerow
2002/0077173 A1 6/2002 Luciano et al.
2002/0077174 A1 6/2002 Luciano et al.
2002/0082070 A1 6/2002 Macke et al.
2002/0082071 A1 6/2002 Riendeau et al.
2002/0082085 A1 6/2002 Osterer
2002/0090986 A1 7/2002 Cote et al.
2002/0094871 A1 7/2002 Luciano, Jr. et al.
2002/0098882 A1 7/2002 Lind et al.
2002/0098883 A1 7/2002 Packes, Jr. et al.
2002/0111207 A1 8/2002 Lind et al.
2002/0111214 A1 8/2002 Lind et al.
2002/0113369 A1 8/2002 Weingardt
2002/0132661 A1 9/2002 Lind et al.
2002/0132666 A1 9/2002 Lind et al.
2002/0155880 A1 * 10/2002 Glavich et al. .................. 463/20
2002/0169018 A1 11/2002 Schneier et al.
2002/0196342 A1 12/2002 Walker et al.
2003/0060257 A1 3/2003 Katz et al.
2003/0060261 A1 3/2003 Katz et al.
2003/0060276 A1 3/2003 Walker et al.
2003/0100371 A1 5/2003 Gatto et al.
2003/0100372 A1 5/2003 Gatto et al.
2003/0104853 A1 6/2003 Tessmer et al.
2003/0125101 A1 7/2003 Campo
2003/0181231 A1 9/2003 Vancura et al.
2003/0190943 A1 10/2003 Walker et al.
2003/0193136 A1 10/2003 Walker et al.
2003/0211884 A1 11/2003 Gauselmann
2004/0014515 A1 1/2004 Tracy et al.
2004/0036212 A1 2/2004 Walker et al.
2004/0038723 A1 2/2004 Schneier et al.
2004/0063489 A1 4/2004 Crumby
2004/0224770 A1 11/2004 Wolf et al.
2005/0137012 A1 6/2005 Michaelson
2005/0148385 A1 7/2005 Michaelson
2006/0052148 A1 3/2006 Blair, Jr. et al.
2006/0094509 A1 5/2006 Michaelson et al.
2006/0154714 A1 7/2006 Montross et al.
2006/0172791 A1 8/2006 Wolf
2006/0205480 A1 * 9/2006 Glavich et al. .................. 463/20
2007/0032285 A1 2/2007 Wolf
2007/0054730 A1 * 3/2007 Mattice et al. .................. 463/16
2007/0105611 A1 * 5/2007 O'Halloran ..................... 463/16
2007/0155480 A1 7/2007 Brosnan et al.
2008/0102919 A1 * 5/2008 Rowe et al. ..................... 463/18
2008/0102923 A1 * 5/2008 Esses et al. ..................... 463/20
2008/0113763 A1 5/2008 Michaelson et al.
2008/0220851 A1 * 9/2008 Glavich et al. .................. 463/20
2008/0254847 A1 10/2008 Millerschone
2008/0254894 A1 10/2008 Michaelson et al.
2008/0300043 A1 12/2008 Sakuma
2009/0104971 A1 * 4/2009 Yoshizawa ...................... 463/20
2009/0181743 A1 7/2009 Bansemer et al.
2009/0298593 A1 * 12/2009 Kobayashi et al. ............. 463/42
2012/0115569 A1 5/2012 Fugisawa et al.
2013/0116045 A1 5/2013 Baerlocher et al.
2013/0122996 A1 5/2013 Lutnick et al.
2013/0137503 A1 5/2013 Baerlocher
2013/0184055 A1 7/2013 Schultz et al.
2013/0252699 A1 9/2013 Nauman et al.
2013/0267299 A1 10/2013 Ching et al.

* cited by examiner

FIG. 4A

130

| Wagering Game (132) | Wager Amount (134) | | Reel Set (136) | |
|---|---|---|---|---|
| | | | Current Play (136a) | Next Play (136b) |
| 132a 1 | 134a | 1 | 141a | 142a |
| | 134b | 2 | 141b | 142b |
| | 134c | 3 | 141c | 142c |
| 132b 2 | 134a | 1 | 141d | 142d |
| | 134b | 2 | 141e | 142e |
| | 134c | 3 | 141f | 142f |
| 132c 3 | 134a | 1 | 141g | 142g |
| | 134b | 2 | 141h | 142h |
| | 134c | 3 | 141i | 142i |

FIG. 4B 130 132 134 136 136a 136b 151a 152a

| Wagering Game | Wager Amount | Reel Set | |
|---|---|---|---|
| | | Current Play | Next Play |
| 132a 1 | 134a 1 | 141a BASE 1 | 142a ALTERNATE 1A |
| | 134b 2 | 141b | 142b |
| | 134c 3 | 141c | 142c |
| 132b 2 | 134a 1 | 141d | 142d |
| | 134b 2 | 141e | 142e |
| | 134c 3 | 141f | 142f |
| 132c 3 | 134a 1 | 141g | 142g |
| | 134b 2 | 141h | 142h |
| | 134c 3 | 141i | 142i |

FIG. 4C

130

| Wagering Game (132) | Wager Amount (134) | | Reel Set (136) | |
|---|---|---|---|---|
| | | | Current Play (136a) | Next Play (136b) |
| 132a 1 | 134a | 1 | 141a | 142a ALTERNATE 1A (152a) |
| | 134b | 2 | 141b | 142b |
| | 134c | 3 | 141c | 142c |
| 132b 2 | 134a | 1 | 141d | 142d |
| | 134b | 2 | 141e | 142e |
| | 134c | 3 | 141f | 142f |
| 132c 3 | 134a | 1 | 141g | 142g |
| | 134b | 2 | 141h BASE 3 (151h) | 142h ALTERNATE 3A (152h) |
| | 134c | 3 | 141i | 142i |

FIG. 4D

130

| Wagering Game (132) | | Wager Amount (134) | | Reel Set (136) Current Play (136a) | | Reel Set (136) Next Play (136b) | |
|---|---|---|---|---|---|---|---|
| 132a | 1 | 134a | 1 | 141a | | 142a | ALTERNATE 1A (152a) |
| | | 134b | 2 | 141b | | 142b | |
| | | 134c | 3 | 141c | BASE 1 (151c) | 142c | ALTERNATE 1B (152c) |
| 132b | 2 | 134a | 1 | 141d | | 142d | |
| | | 134b | 2 | 141e | | 142e | |
| | | 134c | 3 | 141f | | 142f | |
| 132c | 3 | 134a | 1 | 141g | | 142g | |
| | | 134b | 2 | 141h | | 142h | ALTERNATE 3A (152h) |
| | | 134c | 3 | 141i | | 142i | |

FIG. 4E 130, 132, 134, 136, 136a, 136b, 152c, 152a, 153c, 152h

| Wagering Game | Wager Amount | | Reel Set | |
|---|---|---|---|---|
| | | | Current Play | Next Play |
| 132a 1 | 134a | 1 | 141a | 142a ALTERNATE 1A |
| | 134b | 2 | 141b | 142b |
| | 134c | 3 | 141c ALTERNATE 1B | 142c ALTERNATE 1A |
| 132b 2 | 134a | 1 | 141d | 142d |
| | 134b | 2 | 141e | 142e |
| | 134c | 3 | 141f | 142f |
| 132c 3 | 134a | 1 | 141g | 142g |
| | 134b | 2 | 141h | 142h ALTERNATE 3A |
| | 134c | 3 | 141i | 142i |

FIG. 4F

130

| Wagering Game (132) | Wager Amount (134) | Reel Set (136): Current Play (136a) | Reel Set (136): Next Play (136b) |
|---|---|---|---|
| 132a 1 | 134a 1 | 141a | 142a ALTERNATE 1A (152a) |
| | 134b 2 | 141b | 142b |
| | 134c 3 | 141c | 142c ALTERNATE 1A (153c) |
| 132b 2 | 134a 1 | 141d | 142d |
| | 134b 2 | 141e | 142e |
| | 134c 3 | 141f BASE 2 (151f) | 142f ALTERNATE 2C (152f) |
| 132c 3 | 134a 1 | 141g | 142g |
| | 134b 2 | 141h | 142h ALTERNATE 3A (152h) |
| | 134c 3 | 141i | 142i |

FIG. 4G

130

132 134 136 136a 136b

| Wagering Game | Wager Amount | | Reel Set | |
|---|---|---|---|---|
| | | | Current Play | Next Play |
| 132a 1 | 134a | 1 | 141a | 142a ALTERNATE 1A (152a) |
| | 134b | 2 | 141b | 142b |
| | 134c | 3 | 141c | 142c ALTERNATE 1A (153c) |
| 132b 2 | 134a | 1 | 141d | 142d |
| | 134b | 2 | 141e | 142e |
| | 134c | 3 | 141f | 142f ALTERNATE 2C (152f) |
| 132c 3 | 134a | 1 | 141g | 142g |
| | 134b | 2 | 141h ALTERNATE 3A (152h) | 142h ALTERNATE 3B (153h) |
| | 134c | 3 | 141i | 142i |

FIG. 4H

130

| Wagering Game (132) | Wager Amount (134) | | Reel Set (136): Current Play (136a) | Reel Set (136): Next Play (136b) |
|---|---|---|---|---|
| 132a 1 | 134a | 1 | 141a | 142a ALTERNATE 1A (152a) |
| | 134b | 2 | 141b | 142b |
| | 134c | 3 | 141c | 142c ALTERNATE 1A (153c) |
| 132b 2 | 134a | 1 | 141d | 142d |
| | 134b | 2 | 141e | 142e |
| | 134c | 3 | 141f | 142f ALTERNATE 2C (152f) |
| 132c 3 | 134a | 1 | 141g | 142g |
| | 134b | 2 | 141h | 142h ALTERNATE 3B (153h) |
| | 134c | 3 | 141i BASE 3 (151i) | 142i ALTERNATE 3A (152i) |

FIG. 4I

130

| Wagering Game (132) | | Wager Amount (134) | | Reel Set (136) Current Play (136a) | | Reel Set (136) Next Play (136b) | |
|---|---|---|---|---|---|---|---|
| 132a | 1 | 134a | 1 | 141a | | 142a | ALTERNATE 1A (152a) |
| | | 134b | 2 | 141b | | 142b | |
| | | 134c | 3 | 141c | | 142c | ALTERNATE 1A (153c) |
| 132b | 2 | 134a | 1 | 141d | BASE 2 (151d) | 142d | ALTERNATE 2B (152d) |
| | | 134b | 2 | 141e | | 142e | |
| | | 134c | 3 | 141f | | 142f | ALTERNATE 2C (152f) |
| 132c | 3 | 134a | 1 | 141g | | 142g | |
| | | 134b | 2 | 141h | | 142h | ALTERNATE 3B (153h) |
| | | 134c | 3 | 141i | | 142i | ALTERNATE 3A (152i) |

FIG. 4J

130

| Wagering Game (132) | Wager Amount (134) | Reel Set (136) Current Play (136a) | Reel Set (136) Next Play (136b) |
|---|---|---|---|
| 132a 1 | 134a 1 | 141a | 142a ALTERNATE 1A |
| | 134b 2 | 141b | 142b |
| | 134c 3 | 141c ALTERNATE 1A | 142c ALTERNATE 1C |
| 132b 2 | 134a 1 | 141d | 142d ALTERNATE 2B |
| | 134b 2 | 141e | 142e |
| | 134c 3 | 141f | 142f ALTERNATE 2C |
| 132c 3 | 134a 1 | 141g | 142g |
| | 134b 2 | 141h | 142h ALTERNATE 3B |
| | 134c 3 | 141i | 142i ALTERNATE 3A |

153c 152a 154c 152d 152f 153h 152i

FIG. 4K

130 → table; 132 → Wagering Game; 134 → Wager Amount; 136 → Reel Set; 136a → Current Play; 136b → Next Play

| Wagering Game | Wager Amount | Reel Set: Current Play | Reel Set: Next Play | |
|---|---|---|---|---|
| 132a 1 | 134a 1 | 141a | 142a ALTERNATE 1A | 152a |
| | 134b 2 | 141b | 142b | |
| | 134c 3 | 141c | 142c ALTERNATE 1C | 154c |
| 132b 2 | 134a 1 | 141d | 142d ALTERNATE 2B | 152d |
| | 134b 2 | 141e | 142e | |
| | 134c 3 | 141f | 142f ALTERNATE 2C | 152f |
| 132c 3 | 134a 1 | 141g | 142g | |
| | 134b 2 | 141h | 142h ALTERNATE 3B | 153h |
| | 134c 3 | 141i | 142i ALTERNATE 3A | 152i |

GAMING SYSTEM AND METHOD PROVIDING A USER DEVICE THAT RECEIVES AND STORES REEL SETS FOR SUBSEQUENT GAME PLAYS

CROSS REFERENCE TO RELATED APPLICATIONS

This application relates to the following commonly owned, co-pending patent applications: U.S. patent application Ser. No. 13/247,083, filed on Sep. 28, 2011, entitled "GAMING SYSTEM AND METHOD PROVIDING A SERVER THAT DETERMINES REEL SETS FOR SUBSEQUENT GAME PLAYS;" U.S. patent application Ser. No. 13/247,067, filed on Sep. 28, 2011, entitled "GAMING SYSTEM AND METHOD PROVIDING A SERVER THAT DETERMINES A REEL SET FOR AN INITIAL GAME PLAY AND REEL SETS FOR SUBSEQUENT GAME PLAYS;" and U.S. patent application Ser. No. 13/247,075, filed on Sep. 28, 2011, entitled "GAMING SYSTEM AND METHOD PROVIDING A USER DEVICE THAT RECEIVES AND STORES A REEL SET FOR AN INITIAL GAME PLAY AND REEL SETS FOR SUBSEQUENT GAME PLAYS."

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Due to the increasing popularity of internet-connected user devices, such as personal computers, mobile phones, and the like, it is becoming common for wagering game providers to offer users of these user devices the opportunity to play wagering games over the internet. Generally, these wagering games are operated using a client-server architecture in which the user device acts as the client and a server operated by the wagering game provider acts as the server. The server operates the wagering games and communicates information about the wagering games over a network, such as the internet, to the user device, which displays the wagering games.

One such type of wagering game is a spinning reel-type wagering game. There are two common types of spinning reel-type wagering games. A first spinning reel-type wagering game includes a base reel set used in each play of the first wagering game. A memory device accessible by the user device stores data representing the base reel set. For each play of the first wagering game, the server determines an outcome for that play of the first wagering game and sends data representing the determined outcome to the user device. The user device displays the reels of the base reel set spinning and stopping in accordance with the determined outcome. A second spinning reel-type wagering game includes a base reel set and one or more additional reel sets each having an average expected payout percentage greater than an average expected payout percentage of the base reel set. The server stores data representing the base reel set and the additional reel sets. For each play of the second wagering game, the server determines: (i) one of the reel sets for use in that play of the second wagering game, and (ii) an outcome for that play of the second wagering game. The server then sends data representing the determined reel set and the determined outcome to the user device. The user device displays the reels of the determined reel set spinning and stopping in accordance with the determined outcome.

Due to the nature of the client-server architecture and the internet, at certain times there is an appreciable delay (of two to three seconds, for example) between the time a user initiates a play of a wagering game and the time the user device receives data from the server. For example, after the user initiates a play of the first wagering game described above, at certain times there is an appreciable delay before the user device receives the data representing the determined outcome from the server. This delay is not a problem, however, because the user device displays the reels of the base reel set spinning during this time period, and stops the reels in accordance with the determined outcome after receiving the determined outcome from the server. Because the memory device accessible by the user device stores data representing the base reel set, the user device does not wait to receive a reel set from the server and the user does not, therefore, experience any appreciable delay in game play during play of the first wagering game. That is, from the player's perspective, after initiating a play of the first wagering game, the reels immediately being spinning and, thereafter, stop to display an outcome.

The delay is problematic during play of the second wagering game described above. For example, after the user initiates a play of the second wagering game, at certain times there is an appreciable delay before the user device receives the data representing the determined reel set for use in that play of the second wagering game and the data representing the determined outcome from the server. That is, the user device does not display any spinning reels until it receives the determined reel set from the server, which may take two to three seconds. The user thus experiences a delay of, for example, two to three seconds between the time the user initiates a play of the second wagering game and the time the user device displays spinning reels of the determined reel set.

More specifically, for a play of the second wagering game, after the user places a wager and initiates the play, the user device communicates to the server that the user has initiated a play of the second wagering game. The server determines: (i) a reel set for use in that play of the second wagering game, and (ii) an outcome for that play of the second wagering game. The server sends data representing the determined reel set and data representing the determined outcome to the user device. The user device displays the reels of the determined reel set spinning and stops the spinning reels of the determined reel set in accordance with the determined outcome. Thus, after the user initiates the play of the second wagering game, at certain times there is an appreciable delay before the user device displays the reels of the determined reel set spinning, which may frustrate users, especially those who desire to play the wagering game as quickly as possible, and discourage them from continued play of the wagering game.

One previously proposed way to attempt to solve this problem with the second wagering game involves displaying, on the user device, the reels of the base reel set spinning after the user initiates a play of the second wagering game rather than waiting to display spinning reels of the reel set determined by the server. After receiving data representing the determined reel set, the user device then either: (a) stops the spinning reels of the base reel set and displays the determined reel set in accordance with the determined outcome, or (b) replaces the spinning reels of the base reel set with spinning reels of the determined reel set and stops the spinning reels of the determined reel set in accordance with the determined outcome. This previously proposed solution is ineffective, however, because the reel set initially displayed to the user is not necessarily the same reel set determined by the server and displayed to the user at the end of the play of the second wagering game. Users may be confused when they view an outcome that does not correspond to the reel set (i.e., the base reel set in this example) that the user initially viewed, or when they see that the initially-spinning reel set has been replaced with another, different spinning reel set.

The ineffectiveness of this proposed solution is apparent with respect to a proposed spinning reel-type wagering game that includes: (a) a base reel set having an average expected payout percentage equal to an average expected payout percentage of the proposed wagering game, and (b) a stacked WILDs reel set having an average expected payout percentage substantially higher than the base reel set and including a reel that has plurality of WILD symbols positioned adjacent to one another on the reel (i.e., a stack of WILD symbols). Applying the previously proposed solution to this proposed wagering game could result in the following scenario when a user initiates a play of the proposed wagering game. When the user initiates the play, the user device displays the reels of the base reel set spinning. The server determines to use the stacked WILDs reel set in the play of the proposed wagering game, determines an outcome of the play, and sends data representing the stacked WILDs reel set and data representing the determined outcome to the user device. After receiving the data, the user device either: (i) stops the spinning reels of the base reel set and displays the stacked WILDs reel set in accordance with the determined outcome, or (ii) replaces the spinning reels of the base reel set with spinning reels of the stacked WILDs reel set and stops the spinning reels of the stacked WILDs reel set in accordance with the determined outcome.

In either case, the initially-spun base reel set is replaced mid-play with the stacked WILDs reel set. Thus, for a certain period of time, despite the utilization of the stacked WILDs reel set for that play of the proposed wagering game, the user views a spinning set of reels that does not include a reel having a plurality of stacked WILD symbols. This reduces the enjoyment and anticipation associated with a reel set having multiple stacked WILD symbols that a user would normally be able to view while the reels are spinning. The user may also be confused when the user recognizes that the base reel set initially displayed to the user and viewed by the user is not the same reel set displayed to the user at the end of the play of the proposed wagering game.

There is, therefore, a continuing need to decrease the amount of time it takes to complete a play of one of these wagering games over a network and to increase the potential rate of play of users playing these wagering games in a manner that does not confuse users, frustrate users, or reduce users' enjoyment of the wagering game.

Additionally, due to the nature of the client-server architecture and the internet, wagering games played over the internet are susceptible to being hacked and, therefore, data being transferred between the client and server may be intercepted and viewed by a hacker. More specifically, with respect to the second wagering game described above, a hacker may view reel set data and outcome data sent from the server to the user device and, therefore, know which reels are going to be used for a play of the second wagering game and the outcome for that play.

Another previously proposed solution that attempts to remedy the above-described delay problem for the second wagering game involves the server determining reel set and outcome data for each of a plurality of consecutive plays of the second wagering game and sending that data to the user device for use in those plays. In this previously proposed solution, for example, when a player initiates a play of the second wagering game, the server determines a reel set and a corresponding outcome for each of the next five plays of the second wagering game. The server sends data representing each reel set and outcome combination to the user device, which stores the data in a memory device. While the above-described delay will be present for the first play of the second wagering game (because the server determines and sends the data to the user device after initiation of the first play), the delay will, in some cases, be eliminated for the next four plays because the user device already stores the reel set and outcome data for use in those plays.

This previously proposed solution is ineffective, however, because it is susceptible to inbound snooping. For example, there are numerous network traffic capture tools that could allow a hacker to intercept the data representing the determined reel sets to be used in each of the next five plays of the proposed wagering game and the data representing the determined outcomes for those plays sent by the server to the user device. Even if the network traffic is encrypted, a hacker could reverse engineer the client code and/or trace its operation and view internal values of the decrypted data. Thus, the hacker could view the reel set and the outcome for each of the next five games prior to placing a wager on and initiating those games. The hacker could use this information to stop playing the game if the reel sets and/or outcomes are not favorable, or keep playing the game if the reel sets and/or outcomes are favorable. If certain of the outcomes are favorable and certain other outcomes are not favorable, the hacker could increase the hacker's wager on plays having favorable outcomes and decrease the hacker's wager on plays having unfavorable outcomes. It should thus be appreciated that this proposed solution, while at times eliminating the above-described delay for some plays of the wagering game, renders the wagering game susceptible to being hacked and exploited.

Another previously proposed solution that attempts to remedy the above-described delay problem involves the client itself randomly selecting the reel set upon initiation of a play of a game. This previously proposed solution would enable the user device to immediately display the correct reel set upon initiation of a play of the game. This previously proposed solution is ineffective, however, because it is susceptible to outbound hacking. Specifically, a hacker could modify the state of the code in the client and/or change the information sent to the server and, therefore, could consistently cause the most profitable reel sets (i.e., those having the highest average expected payout percentage) to be selected.

Another previously proposed solution that attempts to remedy the above-described hacking problems involves configuring the available reel sets such that each has the same long-term average expected payout percentage for the player. This previously proposed solution does not, however, allow for reel sets of varying value, which is a popular feature.

There is, therefore, a continuing need to provide multi-valued reel set switching functionality for a client/server slot game that avoids security risks and ensures fair game play for all users.

SUMMARY

Various embodiments of the present disclosure provide a gaming system and method providing reel sets for subsequent game plays. More specifically, in the gaming systems and methods of the present disclosure, for each play of a game a server determines: (a) an outcome for that play of the game, and (b) presentation information for use in a subsequent play of that game. The server sends data representing the determined outcome and the determined presentation information to a user device. The user device displays the determined outcome and stores the determined presentation information. When the next play of that game is initiated, the user device uses the stored presentation information to begin displaying that next play of the game. The server determines an outcome for that next play of the game and presentation information for use in another subsequent play of the game. The user device displays the determined outcome and stores the presentation information. It should thus be appreciated that the present disclosure contemplates sending, for each play of a game, outcome data representing an outcome for that play of the game and presentation data representing presentation information for use in a subsequent play of the game.

In one example embodiment, a user device is configured to operate with a server over a network, such as the internet, to enable an identified user to play one or more of a plurality of wagering games. The server identifies the user prior to enabling the user to place any wagers on any plays of any of the wagering games. Once the user has been identified, the user may wager one or more wager amounts on one or more plays of the wagering games using the user device.

In this embodiment, each of the wagering games is a spinning reel-type wagering game that employs one of a plurality of reel sets, each of which includes one or more of a plurality of reels, for a play of that spinning reel-type wagering game. Each of the wagering games includes: (i) a base reel set having an average expected payout percentage equal to an average expected payout percentage of the wagering game, and (ii) at least one additional reel set having an average expected payout percentage greater than the average expected payout percentage of the wagering game. When one of the wagering games is initialized for play, base reel set data representing the base reel set of that wagering game is loaded into, and stored in, a memory device accessible by the user device. In this embodiment, when one of the wagering games is initialized for play, such as when the user loads the application used to play the wagering game, the server sends base reel set data representing the base reel set of that wagering game to the memory device, which stores that base reel set data. That is, the base reel set data is sent by the server to the memory device before the first play of that wagering game is initiated.

For each of the wagering games and for each of the wager amounts, the first time the user wagers that wager amount on a play of that wagering game (i.e., a first play of that wagering game): (a) the user device indicates to the server that the user has initiated the first play of that wagering game; (b) the user device displays the reels of the base reel set of that wagering game spinning based on the base reel set data; and (c) the server determines: (i) an outcome for the first play of that wagering game, and (ii) a second reel set for use in the next play of that same wagering game (i.e., a second play of that same wagering game) on which the user wagers that same wager amount. In this example embodiment, the determined outcome includes which symbols on each of the reels of the determined reel set to display when those reels stop spinning. The server communicates first outcome data representing the determined outcome for the first play of that wagering game and second reel set data representing the second reel set to the user device. The user device receives the first outcome data and the second reel set data and stores the first outcome data and the second reel set data in the memory device accessible by the user device. The user device stops the spinning reels of the base reel set in accordance with the determined outcome based on the first outcome data. Because the memory device accessible by the user device already stores data representing the base reel set upon initiation of the first play of that wagering game, the user device does not wait to receive a reel set from the server and the user does not, therefore, experience any appreciable delay in game play during the first play of that wagering game.

Prior to any awards being provided to the user for the first play of that wagering game, the server validates the reel set used in the first play of that wagering game and the displayed symbols for security purposes. Specifically, the user device communicates to the server which reel set was used for the first play of that wagering game (i.e., the base reel set for that wagering game) and which symbols on the reels of that reel set were displayed after those reels stopped spinning. The server determines whether the reel set used in the first play of that wagering game matches the base reel set and whether the symbols displayed after the reels stopped spinning are in accordance with the determined outcome. If so, the user is provided with any awards associated with the displayed symbols and the first play of that wagering game ends. If not, the server determines that the first play of that wagering game may have been tampered with, no awards are provided to the user for the first play of that wagering game, and the first play of that wagering game ends.

When the user subsequently wagers that same wager amount on a play of that same wagering game (i.e., on the second play of that same wagering game): (a) the user device indicates to the server that the user has initiated the second play of that wagering game; (b) the user device displays the reels of the second reel set spinning based on the second reel set data; (c) the server determines: (i) a third reel set for use in the next play of that same wagering game (i.e., a third play of that same wagering game) on which the user wagers that same wager amount, and (ii) an outcome for the second play of that wagering game; (d) the server communicates third reel set data representing the third reel set to the user device and second outcome data representing the determined outcome for the second play of that wagering game to the user device; (e) the user device receives the third reel set data and the second outcome data and stores the third reel set data and the second outcome data in the memory device; and (f) the user device stops the spinning reels of the second reel set in accordance with the determined outcome based on the second outcome data. Since the memory device already stores the second reel set data upon initiation of the second play of that wagering game, there is no appreciable delay between the time the user initiates the second play of that wagering game and the time the user device displays the second reel set spinning. The server validates the reel set used in the first play of the wagering game and the displayed symbols prior to providing any awards to the user.

The gaming systems and methods of the present disclosure, therefore, solve the above-described problem by decreasing the amount of time it takes to complete a play of a wagering game over a network and increasing the potential rate of play of a user playing the wagering game in a manner that does not confuse the user, frustrate the user, or reduce the user's enjoyment. Specifically, the gaming systems and methods of the present disclosure provide that, for each play of a spinning reel-type wagering game that employs one of a plurality of reel sets for each play, there is no appreciable delay between the time the user initiates a play of that wagering game and the time the user device displays the set of spinning reels for use in that play of that wagering game. This is the case because the memory accessible by the user device stores data representing the reel set to be used in each play of the wagering game prior to that play of the wagering game being initiated.

Further, the reel set employed in each of these plays does not change during that play of the wagering game, thus eliminating any confusion caused by displaying multiple different reel sets to the user during a single play.

Additionally, the gaming systems and methods of the present disclosure solve the above-described problem while enhancing security via the validation step performed prior to providing any awards to the user. This validation step provides a defense against hackers attempting to modify the reels or the outcome determined by the server and sent to the user device to ensure fair game play for all users. Further, since the server of the present disclosure determines and sends an outcome for a play of a wagering game after a user places a wager and initiates that play of the wagering game, even if the user hacks the server, intercepts the data representing the determined outcome, and views the determined outcome, the player cannot use that information to the player's advantage. That is, a hacker's advantage would be limited because the hacker would not be able to view the outcome of subsequent games prior to those games actually being played. More specifically, the hacker would be able to obtain no advantage other than being able to determine on which spin to forever terminate play of the wagering game at a specific wager amount.

Additional features and advantages are described herein, and will be apparent from, the following Detailed Description and the Figures.

BRIEF DESCRIPTION OF THE FIGURES

FIGS. 4A, 4B, 4C, 4D, 4E, 4F, 4G, 4H, 4I, 4J, and 4K are front views of an example database of the present disclosure storing reel set data for a plurality of wagering games and a plurality of wager amounts.

DETAILED DESCRIPTION

Central Server, User Device, and Electronics

The present disclosure may be implemented in various configurations of one or more central servers, central controllers, and remote hosts connected to one or more user devices, such as desktop computers, laptop computers, personal digital assistants (PDAs), portable computing devices, mobile telephones, mobile devices, and hand-held devices through a network such as the internet or a mobile telecommunications network.

Figure 1:
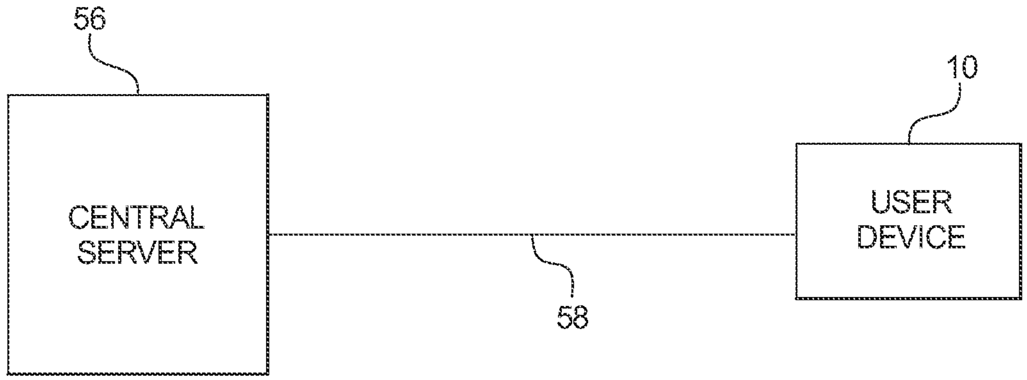
FIG. 1 is a schematic block diagram of one embodiment of a network configuration for a user device and a central server of the present disclosure connected through a network.

In one embodiment, as illustrated in FIG. 1, at least one user device 10 is in communication with at least one central server, central controller, or remote host 56 through a data network or remote communication link 58. In this embodiment, the central server, central controller, or remote host is any suitable server or computing device that includes at least one processor and at least one memory or storage device. In these embodiments, the processor of each user device is designed to transmit and receive events, messages, commands, or any other suitable data or signal between the individual user device and the central server. The user device processor is operable to execute such communicated events, messages, or commands in conjunction with the operation of the user device. Moreover, the processor of the central server is designed to transmit and receive events, messages, commands, or any other suitable data or signal between the central server and each of the individual user devices. The central server processor is operable to execute such communicated events, messages, or commands in conjunction with the operation of the central server.

In various embodiments, the data network is an internet or intranet. In certain of these embodiments, the operation of one or more games played on the user device may be viewed using at least one internet browser. In these embodiments, operation of the user device and accumulation of credits through play of one or more of the games may be accomplished with a connection to the central server, central controller, or remote host (the internet/intranet server) through a conventional phone or other data transmission line, digital subscriber line (DSL), T-1 line, coaxial cable, fiber optic cable, or other suitable connection. In these embodiments, users may access an internet game page from any location where an internet connection and computer or other internet facilitator is available. The expansion in the number of computers and number and speed of internet connections in recent years increases opportunities for users to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the user.

In these embodiments, the computerized instructions for controlling any games are executed by the at least one central server, central controller, or remote host. In such a "thin client" embodiment, the central server, central controller, or remote host remotely controls any games (or other suitable interfaces), and the user device is utilized to display such games (or suitable interfaces) and receive one or more inputs or commands from a user. For example, in one embodiment, the game outcome provided to the user is determined by the central server, central controller, or remote host and provided to the user at the user device through the data network. More specifically, upon a user initiating game play on a user device, the initiated user device communicates a game outcome request to the central server, central controller, or remote host. The central server, central controller, or remote host receives the game outcome request and randomly generates a game outcome for the base or primary game based on probability data. In another embodiment, the central server, central controller, or remote host randomly generates a game outcome for the secondary or bonus game based on probability data. In another embodiment, the central server, central controller, or remote host randomly generates a game outcome for both the base or primary game and the secondary or bonus game based on probability data. In this embodiment, the central server, central controller, or remote host is capable of storing and utilizing program code or other data similar to the processor and memory device of the user device.

In an alternative embodiment, the central server, central controller, or remote host maintains one or more predetermined pools or sets of predetermined game outcomes. In this embodiment, the central server, central controller, or remote host receives the game outcome request and independently selects a predetermined game outcome from a set or pool of game outcomes. The central server, central controller, or remote host flags or marks the selected game outcome as used. Once a game outcome is flagged as used, it is prevented from further selection from the set or pool and cannot be selected by the central server, central controller, or remote host upon another wager. The provided game outcome may include a base or primary game outcome, a secondary or bonus game outcome, base or primary game and secondary or bonus game outcomes, or a series of game outcomes such as free games.

The central server, central controller, or remote host communicates the generated or selected game outcome to the initiated user device. The user device receives the generated or selected game outcome and provides the game outcome to the user. In an alternative embodiment, how the generated or selected game outcome is to be presented or displayed to the user, such as a reel symbol combination of a slot machine or a hand of cards dealt in a card game, is also determined by the central server, central controller, or remote host and communicated to the initiated user device to be presented or displayed to the user. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked user devices based on the results of a bingo, keno, or lottery game. In this embodiment, each individual user device utilizes one or more bingo, keno, or lottery games to determine the predetermined game outcome value provided to the user for the interactive game played at that user device. In one embodiment, the bingo, keno, or lottery game is displayed to the user. In another embodiment, the bingo, keno, or lottery game is not displayed to the user, but the results of the bingo, keno, or lottery game determine the predetermined game outcome value for the base or primary game or the secondary or bonus game.

In the various bingo embodiments, as each user device is enrolled in the bingo game, such as upon an appropriate wager or engaging an input device, the enrolled user device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled user devices, the same element may be present on all four of the bingo cards while another element may solely be present on one of the bingo cards.

In operation of these embodiments, upon providing or associating a different bingo card with each of a plurality of enrolled user devices, the central server, central controller, or remote host randomly selects or draws, one at a time, a plurality of the elements. As each element is selected, a determination is made for each user device as to whether the selected element is present on the bingo card provided to that enrolled user device. This determination may be made by the central server, central controller, or remote host, the user device, a combination of the two, or in any other suitable manner. If the selected element is present on the bingo card provided to that enrolled user device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the user device requires the user to engage a daub button (not shown) to initiate the process of the user device marking or flagging any selected elements.

After one or more predetermined patterns are marked on one or more of the provided bingo cards, a game outcome is determined for each of the enrolled user devices based, at least in part, on the selected elements on the provided bingo cards. As discussed above, the game outcome determined for each user device enrolled in the bingo game is utilized by that user device to determine the predetermined game outcome provided to the user. For example, a first user device to have selected elements marked in a predetermined pattern is provided a first outcome of win $10, which will be provided to a first user regardless of how the first user plays in a first game, and a second user device to have selected elements marked in a different predetermined pattern is provided a second outcome of win $2, which will be provided to a second user regardless of how the second user plays a second game. It should be appreciated that as the process of marking selected elements continues until one or more predetermined patterns are marked, this embodiment ensures that at least one bingo card will win the bingo game, and thus at least one enrolled user device will provide a predetermined winning game outcome to a user. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the user as part of the predetermined game outcome. For example, if the four corners of a bingo card are marked within the first twenty selected elements, a supplemental award of $10 is provided to the user as part of the predetermined game outcome. It should be appreciated that in this embodiment, the user of a user device may be provided a supplemental or intermittent award regardless of whether the enrolled user device's provided bingo card wins or does not win the bingo game as discussed above.

In another embodiment, one or more of the user devices are in communication with a central server or controller for monitoring purposes only. That is, each individual user device randomly generates the game outcomes to be provided to the user and the central server or controller monitors the activities and events occurring on the plurality of user devices. In one embodiment, the gaming network includes a real-time or on-line accounting and gaming information system operably coupled to the central server or controller. The accounting and gaming information system of this embodiment includes a user database for storing user profiles, a user tracking module for tracking users and a credit system for providing automated casino transactions.

In various embodiments, as discussed in more detail below, the central server, central controller, or remote host randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the central server, central controller, or remote host generates the award or other game outcome to be provided to the user based on the associated probabilities. In this embodiment, since the central server, central controller, or remote host generates outcomes randomly or based upon one or more probability calculations, there is no certainty that the central server, central controller, or remote host will ever provide the user with any specific award or other game outcome.

In other embodiments, as discussed in more detail below, the central server, central controller, or remote host employs a predetermined or finite set or pool of awards or other game outcomes. In this embodiment, as each award or other game outcome is provided to the user, the central server, central controller, or remote host flags or removes the provided award or other game outcome from the predetermined set or pool. Once flagged or removed from the set or pool, the specific provided award or other game outcome from that specific pool cannot be provided to the user again. This type of central server, central controller, or remote host provides users with all of the available awards or other game outcomes over the course of the play cycle and guarantees the amount of actual wins and losses.

In another embodiment, as discussed below, upon a user initiating game play at the user device, the central server, central controller, or remote host enrolls in a bingo game. In this embodiment, a bingo server calls the bingo balls that result in a specific bingo game outcome. The resultant game outcome is communicated to the individual user device to be provided to a user. In one embodiment, this bingo outcome is displayed to the user as a bingo game and/or in any form in accordance with the present disclosure.

Figure 2:
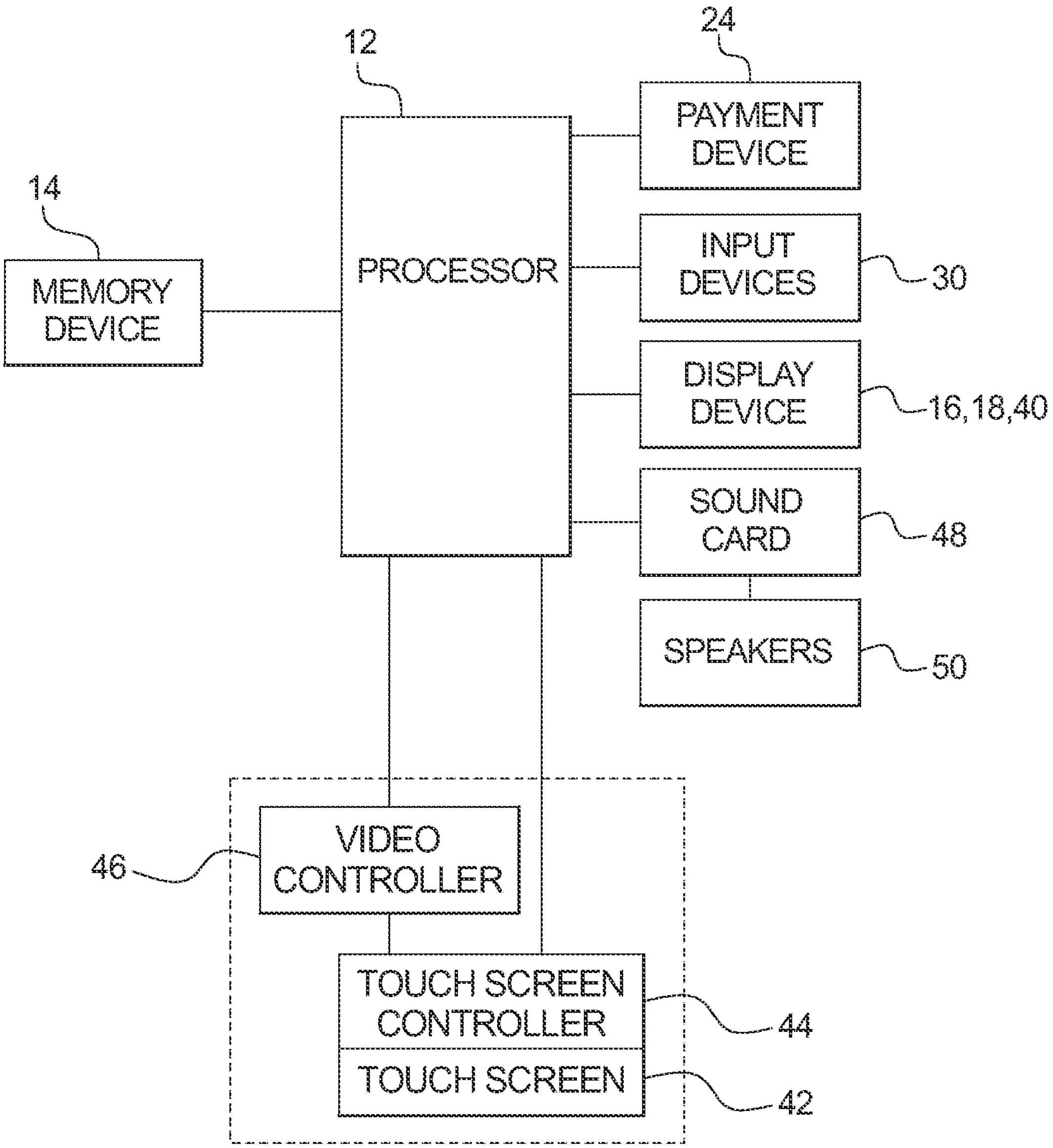
FIG. 2 is a schematic block diagram of one embodiment of an electronic configuration for a user device of the present disclosure.

In one embodiment, as illustrated in FIG. 2, the user device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. The memory device stores program code and instructions, executable by the processor, to control the user device. In some embodiments, the memory device also stores other data such as image data, event data, user input data, random or pseudo-random number generators, pay-table data or information, and applicable game rules that relate to the play of any games on the user device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the user device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, the user device includes one or more display devices controlled by the processor. The display device displays any suitable base or primary game. This display device may also display any suitable secondary or bonus game associated with the base or primary game as well as information relating to the base or primary game or the secondary or bonus game. In one embodiment, the display device displays a credit display that displays a user's current number of credits, cash, account balance, or the equivalent. In one embodiment, the display device displays a bet display that displays a user's amount wagered. In one embodiment, as discussed in more detail below, the display device displays a user tracking display that displays information regarding a user's play tracking status.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the user device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

The user device includes at least one and preferably a plurality of input devices in communication with the processor. The input devices may include any suitable device that enables the user to produce an input signal that is received by the processor.

In one embodiment, as mentioned above, one input device is a touch-screen coupled with a touch-screen controller or some other touch-sensitive display overlay to allow for user interaction with the images on the display. The touch-screen and the touch-screen controller are connected to a video controller. A user may make decisions and input signals into the user device by touching the touch-screen at the appropriate locations. One such input device is a conventional touch-screen button panel.

The user device may further include a plurality of communication ports for enabling communication of the processor with external peripherals, such as external video sources, expansion buses, game or other displays, a SCSI port, or a keypad.

In one embodiment, as shown in FIG. 2, the user device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game.

In one embodiment, the user device may include a sensor, such as a camera, in communication with the processor (and possibly controlled by the processor) that is selectively positioned to acquire an image of a user actively using the user device and/or the surrounding area of the user device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the user and the processor may incorporate that image into the base or primary game and/or the secondary or bonus game as a game image, symbol, or indicia.

In various embodiments, the user device is configured to enable a user to place one or more wagers on one or more plays of one or more wagering games, and to display those plays of those wagering games as directed by the central server, central controller, or remote host. The user device and the central server, central controller, or remote host may be configured to implement any suitable base or primary game and any suitable secondary or bonus game associated with the base or primary game. The user device may incorporate any suitable reel-type game, card game, cascading or falling symbol game, number game, or other game of chance susceptible to representation in an electronic form as a secondary or bonus game or feature, which in one embodiment produces a random outcome based on probability data at the time of or after placement of a wager. That is, different base or primary games or secondary or bonus games, such as video poker games, video blackjack games, video keno games, and video bingo games may be implemented.

In one embodiment, the base or primary game and/or the secondary or bonus game includes one or more paylines associated with a plurality of symbol display positions. The paylines may be horizontal, vertical, circular, diagonal, angled, or any combination thereof. In this embodiment, the user device displays at least one and preferably a plurality of reels, such as three to five reels, in video form. Each reel displays a plurality of indicia or symbols, such as bells, hearts, fruits, numbers, letters, bars, or other images that preferably correspond to a theme associated with the game. In another embodiment, one or more of the reels are independent reels or unisymbol reels. In this embodiment, each independent or unisymbol reel generates and displays one symbol to the user. In one embodiment, the central server, central controller, or remote host awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the user by analyzing the symbols generated on any wagered upon paylines as discussed above, the central server, central controller, or remote host determines any outcome to provide to the user based on the number of associated symbols that are generated in active symbol positions on the requisite number of adjacent reels (i.e., not on paylines passing through any displayed winning symbol combinations). In this embodiment, if a winning symbol combination is generated on the reels, the central server, central controller, or remote host provides the user one award for that occurrence of the generated winning symbol combination. For example, if one winning symbol combination is generated on the reels, the central server, central controller, or remote host will provide a single award to the user for that winning symbol combination (i.e., not based on the number of paylines that would have passed through that winning symbol combination). It should be appreciated that because a central server, central controller, or remote host that enables wagering on ways to win provides the user one award for a single occurrence of a winning symbol combination and a user device with paylines may provide the user more than one award for the same occurrence of a single winning symbol combination (i.e., if a plurality of paylines each pass through the same winning symbol combination), it is possible to provide a user at a ways to win user device with more ways to win for an equivalent bet or wager on a traditional slot user device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the user device with at least one symbol generated in an active symbol position. For example, a three reel game with three symbols generated in active symbol positions on each reel includes 27 ways to win (i.e., 3 symbols on the first reel×3 symbols on the second reel×3 symbols on the third reel). A four reel game with three symbols generated in active symbol positions on each reel includes 81 ways to win (i.e., 3 symbols on the first reel×3 symbols on the second reel×3 symbols on the third reel×3 symbols on the fourth reel). A five reel game with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the user device and the central server, central controller, or remote host enable a user to wager on and thus activate symbol positions. In one such embodiment, the symbol positions are on the reels. In this embodiment, if a reel is activated based on the user's wager, then each of the symbol positions of that reel will be activated and each of the active symbol positions will be part of one or more of the ways to win. In one embodiment, if a reel is not activated based on the user's wager, then a designated number of default symbol positions, such as a single symbol position of the middle row of the reel, will be activated and the default symbol position(s) will be part of one or more of the ways to win. This enables a user to wager on one, more than one, or all of the reels, and the processor of the central server, central controller, or remote host uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the user but suitably shaded or otherwise designated as inactive.

In one embodiment wherein a user wagers on one or more reels, a user's wager of one credit may activate each of the three symbol positions on a first reel, wherein one default symbol position is activated on each of the remaining four reels. In this example, as discussed above, the central server, central controller, or remote host provides the user three ways to win (i.e., 3 symbols on the first reel×1 symbol on the second reel×1 symbol on the third reel×1 symbol on the fourth reel×1 symbol on the fifth reel). In another example, a user's wager of nine credits may activate each of the three symbol positions on a first reel, each of the three symbol positions on a second reel and each of the three symbol positions on a third reel wherein one default symbol position is activated on each of the remaining two reels. In this example, as discussed above, the user device provides the user twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the user based on the generated symbols, the central server, central controller, or remote host individually determines if a symbol generated in an active symbol position on a first reel forms part of a winning symbol combination with or is otherwise suitably related to a symbol generated in an active symbol position on a second reel. In this embodiment, the central server, central controller, or remote host classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the user device classifies the two cherry symbols as a string of related symbols because the two cherry symbols form part of a winning symbol combination.

After determining if any strings of related symbols are formed between the symbols on the first reel and the symbols on the second reel, the central server, central controller, or remote host determines if any of the symbols from the next adjacent reel should be added to any of the formed strings of related symbols. In this embodiment, for a first of the classified strings of related symbols, the central server, central controller, or remote host determines if any of the symbols generated by the next adjacent reel form part of a winning symbol combination or are otherwise related to the symbols of the first string of related symbols. If the central server, central controller, or remote host determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the user device adds the related cherry symbol generated on the third reel to the previously classified string of cherry symbols.

On the other hand, if the central server, central controller, or remote host determines that no symbols generated on the next adjacent reel are related to the symbols of the first string of related symbols, the central server, central controller, or remote host marks or flags such string of related symbols as complete. For example, if the first string of related symbols is the string of related cherry symbols and none of the symbols of the third reel are related to the cherry symbols of the previously classified string of cherry symbols, the central server, central controller, or remote host marks or flags the string of two cherry symbols as complete.

After either adding a related symbol to the first string of related symbols or marking the first string of related symbols as complete, the central server, central controller, or remote host proceeds as discussed above for each of the remaining classified strings of related symbols that were previously classified or formed from related symbols on the first and second reels.

After analyzing each of the remaining strings of related symbols, the central server, central controller, or remote host determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the central server, central controller, or remote host marks each of the remaining pending strings of related symbols as complete.

When each of the strings of related symbols is marked complete, the central server, central controller, or remote host compares each of the strings of related symbols to an appropriate paytable and provides the user any award associated with each of the completed strings of symbols. It should be appreciated that the user is provided one award, if any, for each string of related symbols generated in active symbol positions (i.e., as opposed to a quantity of awards being based on how many paylines that would have passed through each of the strings of related symbols in active symbol positions).

In one embodiment, base or primary game or the secondary or bonus game may be a poker game wherein the user device and the central server, central controller, or remote host enable the user to play a conventional game of video draw poker. Five cards are initially dealt to the player face up from a virtual deck of fifty-two cards. Cards may be dealt as in a traditional game of cards or in the case of the user device, the cards may be randomly selected from a predetermined number of cards. If the user wishes to draw, the user selects the cards to hold via one or more input devices, such as by pressing related hold buttons or via the touch screen. The user then presses the deal button and the unwanted or discarded cards are removed from the display and the player is dealt the replacement cards from the remaining cards in the deck. This results in a final five-card hand. The central server, central controller, or remote host compares the final five-card hand to a payout table that utilizes conventional poker hand rankings to determine the winning hands. The user is provided with an award based on a winning hand and the number of credits the user wagered.

In another embodiment, the base or primary game or the secondary or bonus game may be a multi-hand version of video poker. In this embodiment, the user is dealt at least two hands of cards. In one such embodiment, the cards are the same cards. In one embodiment each hand of cards is associated with its own deck of cards. The user chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the user.

In one embodiment, the base or primary game or the secondary or bonus game may be a keno game wherein the central server, central controller, or remote host directs the user device to display a plurality of selectable indicia or numbers on at least one of the display devices. In this embodiment, the user selects at least one of a plurality of the selectable indicia or numbers via an input device such as a touch screen. The central server, central controller, or remote host then directs the user device to display a series of drawn numbers and determines an amount of matches, if any, between the user's selected numbers and the central server, central controller, or remote host's drawn numbers. The user is provided an award based on the amount of matches, if any, based on the amount of determined matches and the number of numbers drawn.

In one embodiment, as noted above, in addition to winning credits or other awards in the base or primary game, the central server, central controller, or remote host may also give users the opportunity to win credits in a secondary or bonus game or in a secondary or bonus round. The secondary or bonus game enables the user to obtain a prize or payout in addition to the prize or payout, if any, obtained from the base or primary game. In general, a secondary or bonus game produces a significantly higher level of user excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia in the base or primary game, such as a BONUS symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, the central server, central controller, or remote host randomly provides the user one or more plays of one or more secondary or bonus games. In one such embodiment, the central server, central controller, or remote host does not provide any apparent reason to the user for qualifying to play a secondary or bonus game. In this embodiment, qualifying for a secondary or bonus game is not triggered by an event in or based specifically on any of the plays of the base or primary game. That is, the central server, central controller, or remote host may simply qualify a user to play a secondary or bonus game without any explanation or alternatively with simple explanations. In another embodiment, the central server, central controller, or remote host qualifies a user for a secondary or bonus game at least partially based on a game triggered or symbol triggered event, such as at least partially based on the play of the base or primary game.

In one embodiment, the central server, central controller, or remote host includes a program that will automatically direct the user device to begin a secondary or bonus round after the user has achieved a triggering event or qualifying condition in the base or primary game. In another embodiment, after a user has qualified for a secondary or bonus game, the user may subsequently enhance the user's secondary or bonus game participation through continued play of the base or primary game. Thus, for each secondary or bonus qualifying event, such as a bonus symbol, that the user obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the user may redeem extra secondary or bonus wagering credits during the secondary or bonus game to extend play of the secondary or bonus game.

In one embodiment, no separate entry fee or buy-in for a secondary or bonus game is needed. That is, a user may not purchase entry into a secondary or bonus game; rather, the user must win or earn entry through play of the base or primary game, thus encouraging play of the base or primary game. In another embodiment, qualification of the secondary or bonus game is accomplished through a simple "buy-in" by the user—for example, if the user has been unsuccessful at qualifying through other specified activities. In another embodiment, the user must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

In one embodiment, the central server, central controller, or remote host disclosed herein is associated with or otherwise integrated with one or more user tracking systems. User tracking systems enable gaming establishments to recognize the value of customer loyalty through identifying frequent customers and rewarding them for their patronage. In one embodiment, the central server, central controller, or remote host and/or user tracking system tracks any user's gaming activity using the user device. The central server, central controller, or remote host communicates such information to the user tracking system. The central server, central controller, or remote host and/or associated user tracking system also timely tracks when a user concludes play for that gaming session.

During one or more gaming sessions, the central server, central controller, or remote host and/or user tracking system tracks any suitable information or data, such as any amounts wagered, average wager amounts, and/or the time at which these wagers are placed. In different embodiments, for one or more users, the user tracking system includes the user's account number, the user's card number, the user's first name, the user's surname, the user's preferred name, the user's user tracking ranking, the user's address, the user's birthday, the user's anniversary, the user's recent gaming sessions, or any other suitable data. In one embodiment, such tracked information and/or any suitable feature associated with the user tracking system is displayed on a user tracking display.

In one embodiment, a plurality of user devices are capable of being connected together through a data network. In one embodiment, the data network is a local area network (LAN), in which one or more of the user devices are substantially proximate to each other and an on-site central server or central controller. In another embodiment, the data network is a wide area network (WAN) in which one or more of the user devices are in communication with at least one central server, central controller, or remote host.

In another embodiment, a plurality of user devices may be networked to the central server in a progressive configuration, as known in the art, wherein a portion of each wager to initiate the base or primary game may be allocated to one or more progressive awards.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play.

In another embodiment, a user device is randomly or apparently randomly selected to provide a user of that user device one or more progressive awards. In one such embodiment, the central server, central controller, or remote host does not provide any apparent reasons to the user for winning a progressive award, wherein winning the progressive award is not triggered by an event in or based specifically on any of the plays of the base or primary game. That is, a user is provided a progressive award without any explanation or, alternatively, with simple explanations. In another embodiment, a user is provided a progressive award at least partially based on a game triggered or symbol triggered event, such as at least partially based on the play of the base or primary game.

In one embodiment, one or more of the progressive awards are each funded via a side bet or side wager. In this embodiment, a user must place or wager a side bet to be eligible to win the progressive award associated with the side bet. In one embodiment, the user must place the maximum bet and the side bet to be eligible to win one of the progressive awards. In another embodiment, if the user places or wagers the required side bet, the user may wager any credit amount during the base or primary game (i.e., the user need not place the maximum bet and the side bet to be eligible to win one of the progressive awards). In one such embodiment, the greater the user's wager (in addition to the placed side bet), the greater the odds or probability that the user will win one of the progressive awards. It should be appreciated that one or more of the progressive awards may each be funded, at least in part, based on the wagers placed on the base or primary game of the user devices in the gaming system, via a gaming establishment or via any suitable manner.

In another embodiment, one or more of the progressive awards are partially funded via a side-bet or side-wager that the user may make (and that may be tracked via a side-bet meter). In one embodiment, one or more of the progressive awards are funded with only side-bets or side-wagers placed. In another embodiment, one or more of the progressive awards are funded based on users' wagers as discussed above as well as any side-bets or side-wagers placed.

In one alternative embodiment, a minimum wager level is required for a user device to qualify to be selected to obtain one of the progressive awards. In one embodiment, this minimum wager level is the maximum wager level for the base or primary game in the user device. In another embodiment, no minimum wager level is required for a user device to qualify to be selected to obtain one of the progressive awards.

In another embodiment, a plurality of users at a plurality of linked user devices in a gaming system participate in a group gaming environment. In one embodiment, a plurality of users at a plurality of linked user devices work in conjunction with one another, such as by playing together as a team or group, to win one or more awards. In one such embodiment, any award won by the group is shared, either equally or based on any suitable criteria, among the different users of the group. In another embodiment, a plurality of users at a plurality of linked user devices compete against one another for one or more awards. In one such embodiment, a plurality of users at a plurality of linked user devices participate in a gaming tournament for one or more awards. In another embodiment, a plurality of users at a plurality of linked user devices play for one or more awards wherein an outcome generated by one user device affects the outcomes generated by one or more linked user devices.

User Device that Receives and Stores Reel Sets for Subsequent Game Plays

A user device may be configured to operate with a server over a network such as the internet to enable an identified user to play a plurality of wagering games. More specifically, a user device may be set up by the user such that it enables the user to wager one or more wager amounts on plays of one or more wagering games. Once the user device has been set up to enable the user to play the wagering games, the server identifies the user prior to enabling the user to wager any wager amounts on any plays of any of the wagering games. Once the user has been identified, the user may wager one or more wager amounts on one or more plays of the wagering games using the user device.

In various embodiments, each of the wagering games is a spinning reel-type wagering game that employs one of a plurality of reel sets, each of which includes one or more of a plurality of reels, for a play of that spinning reel-type wagering game. Each of the wagering games includes: (i) a base reel set having an average expected payout percentage equal to an average expected payout percentage of the wagering game, and (ii) at least one additional reel set having an average expected payout percentage greater than the average expected payout percentage of the wagering game. When one of the wagering games is initialized for play, base reel set data representing the base reel set or sets of that wagering game is loaded into, and stored in, a memory device accessible by the user device. In this embodiment, when one of the wagering games is initialized for play, such as when the user loads the application used to play the wagering game, the server sends base reel set data representing the base reel set of that wagering game to the memory device, which stores that base reel set data. In other words, the base reel set data is sent by the server to the memory device before the first play of that wagering game is initiated.

For each of the wagering games and for each of the wager amounts, the first time the user wagers that wager amount on a play of that wagering game (i.e., a first play of that wagering game): (a) the user device indicates to the server that the user has initiated the first play of that wagering game; (b) the user device displays the reels of the base reel set of that wagering game spinning based on the base reel set data; and (c) the server determines: (i) an outcome for the first play of that wagering game, and (ii) a second reel set for use in the next play of that same wagering game (i.e., a second play of that same wagering game) on which the user wagers that same wager amount. In this example embodiment, the determined outcome includes which symbols on each of the reels of the determined reel set to display when those reels stop spinning. The server communicates first outcome data representing the determined outcome for the first play of that wagering game and second reel set data representing the second reel set to the user device. The user device receives the first outcome data and the second reel set data and stores the first outcome data and the second reel set data in the memory device accessible by the user device. The user device stops the spinning reels of the base reel set in accordance with the determined outcome based on the first outcome data. Because the memory device accessible by the user device already stores data representing the base reel set upon initiation of the first play of that wagering game, the user device does not wait to receive a reel set from the server and the user does not, therefore, experience any appreciable delay in game play during the first play of that wagering game.

It should be appreciated that the server determines the second reel set from the group including the base reel set and the alternate reel sets for that wagering game. It should also be appreciated that the server determines the second reel set in any suitable manner, such as randomly or via weighted probability.

Prior to any awards being provided to the user for the first play of that wagering game, the server validates the reel set used in the first play of that wagering game and the displayed symbols for security purposes. Specifically, the user device communicates to the server which reel set was used for the first play of that wagering game (i.e., the base reel set for that wagering game in this example) and which symbols on the reels of that reel set were displayed after those reels stopped spinning. The server determines whether the reel set used in the first play of that wagering game matches the base reel set and whether the symbols displayed after the reels stopped spinning are in accordance with the determined outcome. If so, the user is provided with any awards associated with the displayed symbols and the first play of that wagering game ends. If not, the server determines that the first play of that wagering game may have been tampered with, no awards are provided to the user for the first play of that wagering game, and the first play of that wagering game ends.

When the user subsequently wagers that same wager amount on a play of that same wagering game (i.e., on the second play of that same wagering game): (a) the user device indicates to the server that the user has initiated the second play of that wagering game; (b) the user device displays the reels of the second reel set spinning based on the second reel set data; (c) the server determines: (i) a third reel set for use in the next play of that same wagering game (i.e., a third play of that same wagering game) on which the user wagers that same wager amount, and (ii) an outcome for the second play of that wagering game; (d) the server communicates third reel set data representing the third reel set to the user device and second outcome data representing the determined outcome for the second play of that wagering game to the user device; (e) the user device receives the third reel set data and the second outcome data and stores the third reel set data and the second outcome data in the memory device; and (f) the user device stops the spinning reels of the second reel set in accordance with the determined outcome based on the second outcome data. Since the memory device already stores the second reel set data upon initiation of the second play of that wagering game, there is no appreciable delay between the time the user initiates the second play of that wagering game and the time the user device displays the second reel set spinning. The server validates the reel set used in the first play of the wagering game and the displayed symbols prior to providing any awards to the user.

It should be appreciated that, for each play of each of the wagering games, there will be no appreciable delay between the time the user initiates that play of that wagering game and the time the user device displays the reels of the reel set for use in that play of that wagering game spinning because reel set data representing that reel set will have already been stored in the memory device accessible by the user device prior to the initiation of that play of that wagering game. The user device does not have to wait to receive reel set data from the server before displaying spinning reels for that play of that wagering game.

It should also be appreciated that, in this embodiment, for each play of each of the wagering games: (a) the reel set used in that play of the wagering game is determined by the server and stored in the memory device accessible by the user device prior to that play of the wagering game being initiated, and (b) the server determines the outcome for that play of the wagering game after that play of the wagering game is initiated. The reel set and the outcome for each play of the wagering game are, therefore, determined by the server and sent to the user device separately from one another and at different times.

Figure 3A:
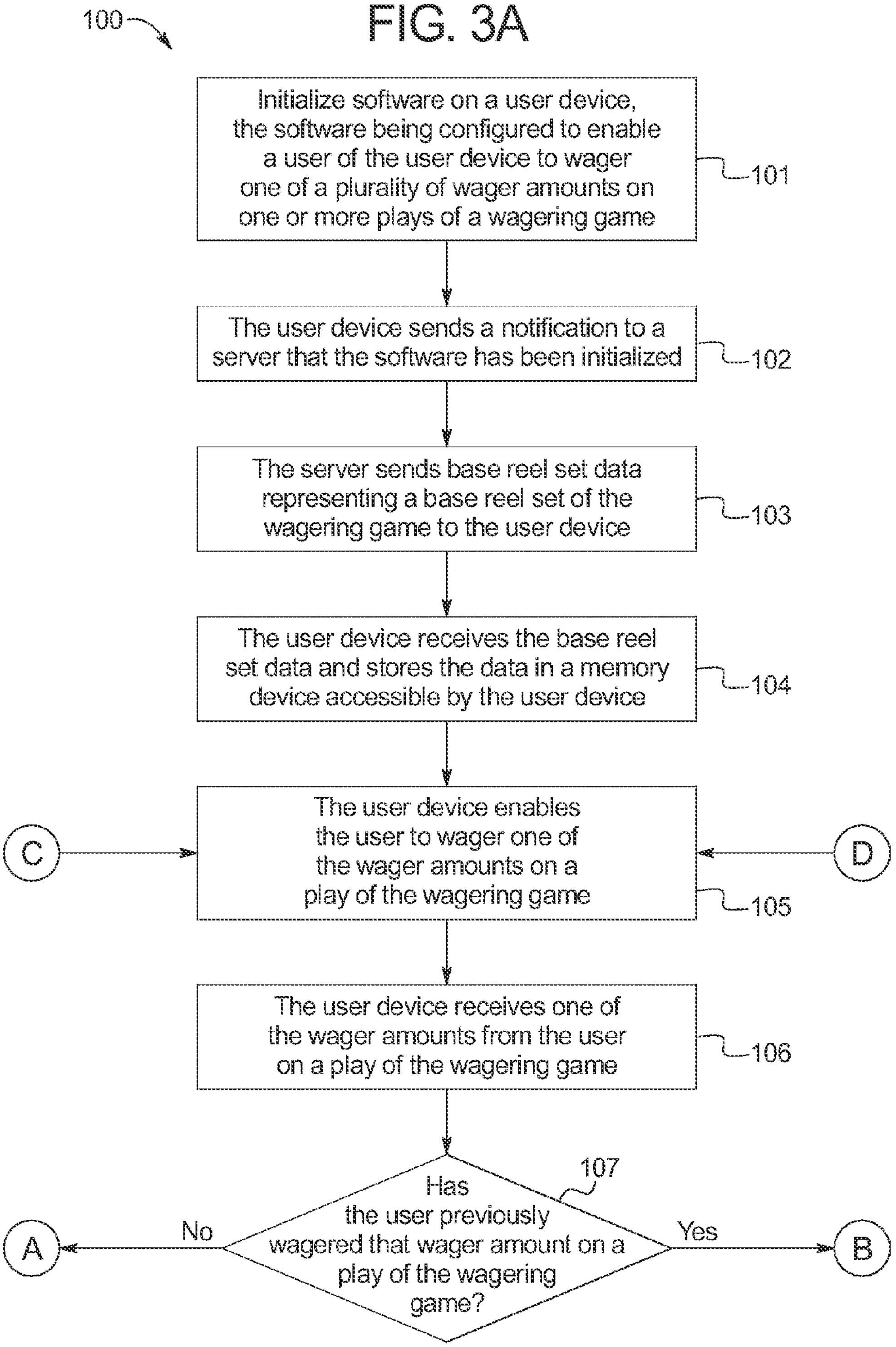
FIGS. 3A, 3B, and 3C are flowcharts of an example embodiment of a method or process or operating the system, including the server and the user device, of the present disclosure.
Figure 3B:
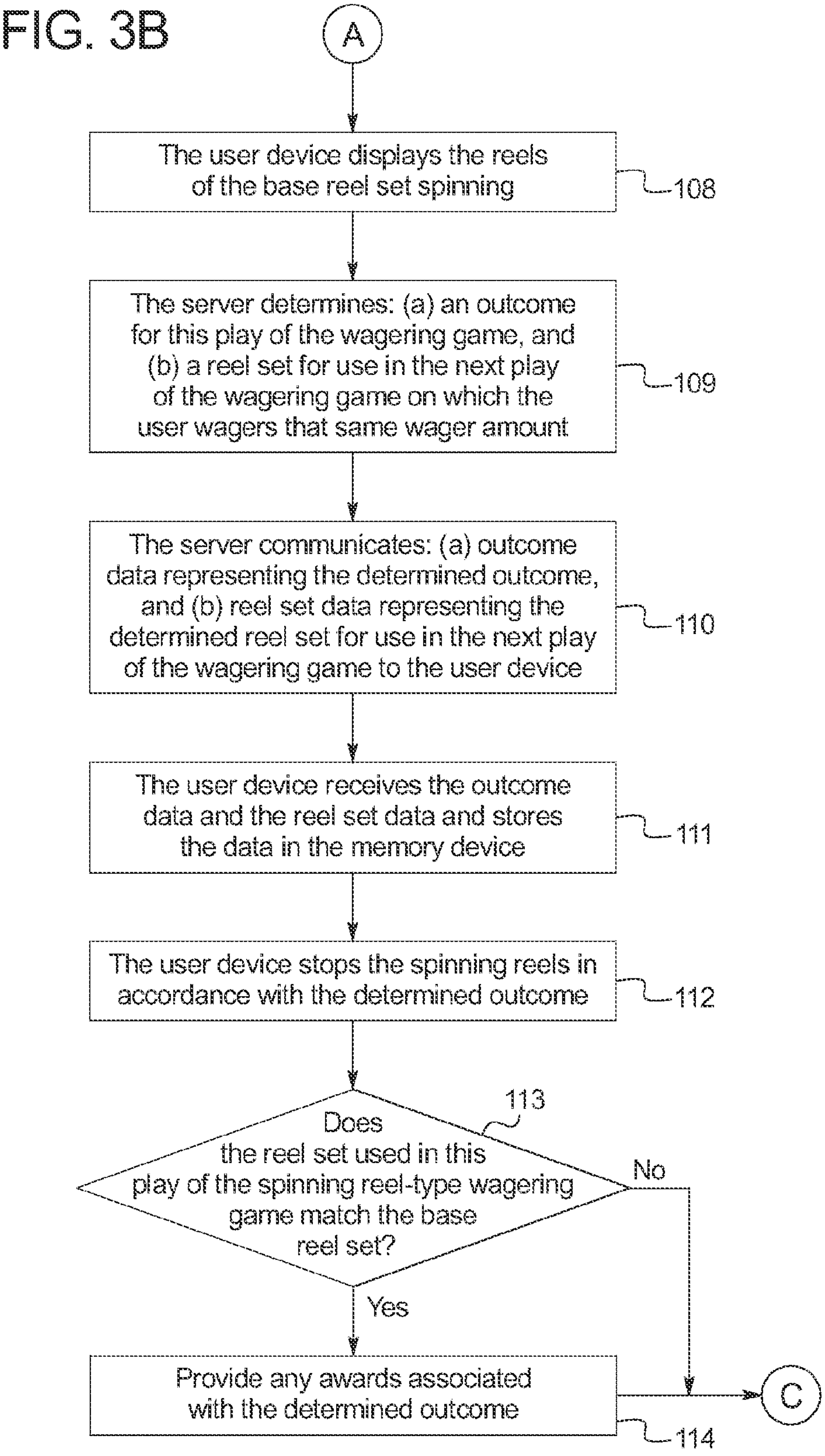
Figure 3C:
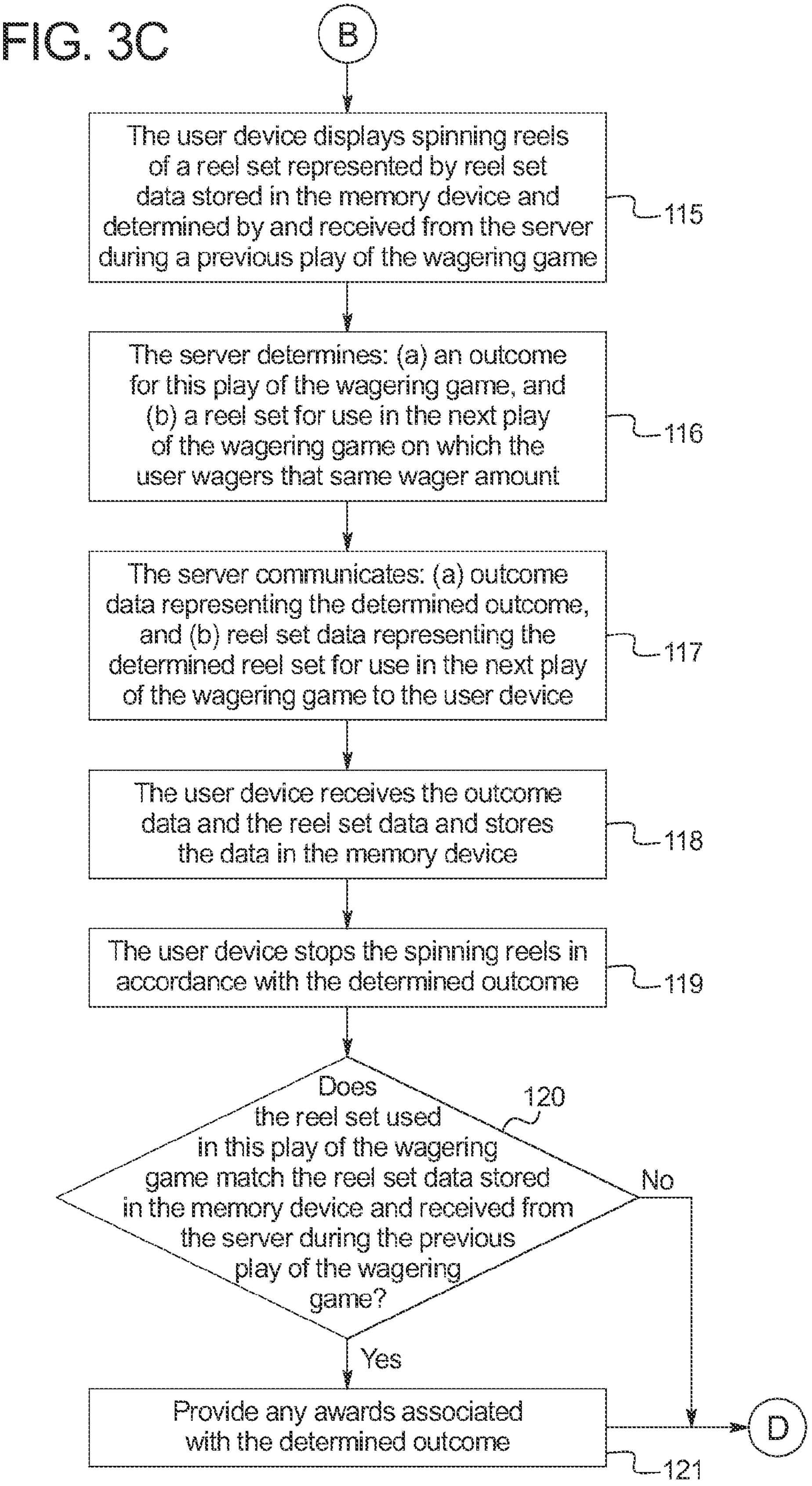

FIGS. 3A, 3B, and 3C illustrate flowcharts of one example embodiment of a process or method 100 for operating the system (including the server and the user device) of the present disclosure. In one embodiment, this process 100 is stored in one or more memories and executed by one or more processors or controllers. Although this process 100 is described with reference to the flowcharts shown in FIGS. 3A, 3B, and 3C, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

As illustrated in FIG. 3A, in operation of one embodiment, software on the user device is initialized (by a user of the user device, for example), as indicated by block 101. The software is configured to enable the user to wager one of a plurality of wager amounts on one or more plays of a wagering game. In this example embodiment, the wagering game is a spinning reel-type wagering game. The user device sends a notification to the server notifying the server that the software has been initialized, as indicated by block 102. The server sends base reel set data representing a base reel set of the wagering game to the user device, as indicated by block 103. The user device receives the base reel set data and stores the base reel set data in a memory device accessible by the user device, as indicated by block 104. The user device enables the user to wager one of the wager amounts on a play of the wagering game, as indicated by block 105. The user device receives one of the wager amounts from the user on a play of the wagering game, as indicated by block 106. The system (i.e., the user device or the server, depending upon the embodiment) determines whether the user has previously wagered that wager amount on a play of the wagering game, as indicated by diamond 107.

As illustrated in FIG. 3B, if the user has previously wagered that wager amount on a play of the wagering game, process 100 proceeds to block 108 and the user device displays the reels of the base reel set spinning, as indicated by block 108. The server determines: (a) an outcome for this play of the wagering game, and (b) a reel set for use in the next play of the wagering game on which the user wagers that same wager amount, as indicated by block 109. The server communicates: (a) outcome data representing the determined outcome, and (b) reel set data representing the determined reel set for use in the next play of the wagering game to the user device, as indicated by block 110. The user device receives the outcome data and the reel set data and stores the outcome data and the reel set data in the memory device, as indicated by block 111. The user device stops the spinning reels in accordance with the determined outcome, as indicated by block 112. The system (i.e., the user device or the server, depending upon the embodiment) determines whether the reel set used in this play of the wagering game matches the base reel set, as indicated by diamond 113. If so, any awards associated with the determined outcome are provided, as indicated by block 114, and process 100 returns to block 105. If not, process 100 returns to block 105.

As illustrated in FIG. 3C, if the user has not previously wagered that wager amount on a play of the wagering game, process 100 proceeds to block 115 and the user device displays spinning reels of a reel set represented by reel set data stored in the memory device, as indicated by block 115. The reel set data was determined by and received from the server during a previous play of the wagering game. The server determines: (a) an outcome for this play of the wagering game, and (b) a reel set for use in the next play of the wagering game on which the user wagers that same wager amount, as indicated by block 116. The server communicates: (a) outcome data representing the determined outcome, and (b) reel set data representing the determined reel set for use in the next play of the wagering game to the user device, as indicated by block 117. The user device receives the outcome data and the reel set data and stores the outcome data and the reel set data in the memory device, as indicated by block 118. The user device stops the spinning reels in accordance with the determined outcome, as indicated by block 119. The system (i.e., the user device or the server, depending upon the embodiment) determines whether the reel set used in this play of the wagering game matches the reel set data stored in the memory device and received from the server during the previous play of the wagering game, as indicated in diamond 120. If so, any awards associated with the determined outcome are provided, as indicated by block 121, and process 100 returns to block 105. If not, the process returns to block 105.

An exemplary embodiment of the gaming system and method of the present disclosure is discussed below with respect to a specific user playing one or more wagering games on the user's user device. The user device is set up by the user, the user device manufacturer, or any other suitable individual or entity to enable the user to play one or more of the wagering games. In one example, software that configures the user device such that it may operate the wagering games is loaded onto the user device. In this example, when the software is executed by one or more processors of the user device, the user device enables the user to play the wagering games. It should be appreciated that such software may be loaded onto the user device via a CD, DVD, USB drive, or other computer readable medium. In other embodiments, such software is downloaded to the user device through the internet, a mobile telecommunications network, or any other suitable network. In another example, the user accesses a web page using the user device via the internet, a mobile telecommunications network, or any other suitable network. The user may then play the wagering games on the user device through the web page. It should be appreciated that the user device may be set up to enable the user to play the wagering games in any suitable manner.

Once the user device has been set up to enable the user to play the wagering games, the server identifies the user prior to enabling the user to place any wagers on any plays of any of the wagering games. It should be appreciated that the server identifies the user in any suitable manner, such as by validating a username and password input by the user; by validating a user tracking identification number associated with the user, such by reading a player tracking card or other smart card inserted into a card reader or, in the case of a wagering game being played remotely, a unique player identification number associated with the player by the server; and/or by identifying the user device (e.g., by identifying the MAC address or the IP address of the user device).

Once the user has been identified, the user may wager one or more wager amounts on one or more plays of one or more of the wagering games using the user device. In this example, the user device is configured to operate three different wagering games: a first wagering game, a second wagering game, and a third wagering game. Each of the first, second, and third wagering games is a spinning-reel type wagering game that employs one of a plurality of reel sets, each of which includes three of a plurality of reels, for a play of that wagering game. In this example: the first wagering game includes a base reel set, BASE 1, which has an average expected payout percentage equal to an average expected payout percentage of the first wagering game, and three alternate reel sets, ALTERNATE 1A, ALTERNATE 1B, and ALTERNATE 1C, each of which has an average expected payout percentage greater than the average expected payout percentage of the first wagering game; the second wagering game includes a base reel set, BASE 2, which has an average expected payout percentage equal to an average expected payout percentage of the second wagering game, and three alternate reel sets, ALTERNATE 2A, ALTERNATE 2B, and ALTERNATE 2C, each of which has an average expected payout percentage greater than the average expected payout percentage of the second wagering game; and the third wagering game includes a base reel set, BASE 3, which has an average expected payout percentage equal to an average expected payout percentage of the third wagering game, and three alternate reel sets, ALTERNATE 3A, ALTERNATE 3B, and ALTERNATE 3C, each of which has an average expected payout percentage greater than the average expected payout percentage of the third wagering game.

While, in this embodiment, each of the alternate reel sets has a different average expected payout percentage than the base reel set, it should be appreciated that the present disclosure contemplates that one of, a plurality of, or each of the alternate reel sets may have an average expected payout percentage that is equal to the average expected payout percentage of the base reel set.

The user selects which of the wagering games the user wishes to play, and the user device enables the user to wager one of three different wager amounts—a first wager amount, a second wager amount, and a third wager amount—on a play of the selected wagering game. In this example, at the outset the user has yet to play any of the first, second, or third wagering games.

The user device or server, depending upon the embodiment, creates a database associated with the user that stores reel set data associated with one or more plays of the first, second, and third wagering games and stores the database in a memory device accessible by the user device. FIG. 4A illustrates an example database 130 that stores reel set data communicated by the server to the user device. Database 130 includes wagering game identifiers 132, including first wagering game identifier 132*a*, second wagering game identifier 132*b*, and third wagering game identifier 132*c*. Database 130 also includes wager amount identifiers 134, including first wager amount identifier 134*a*, second wager amount identifier 134*b*, and third wager amount identifier 134*c*. Database 130 includes reel set storage areas 136, including current play reel set storage areas 136*a* and next play reel set storage areas 136*b*.

More specifically, current play reel set storage areas 136*a* include: current play reel set storage area 141*a*, which stores reel set data determined by the server and communicated to the user device that represents a reel set to be used in a current play of the first wagering game on which the user wagered the first wager amount; current play reel set storage area 141*b*, which stores reel set data determined by the server and communicated to the user device that represents a reel set to be used in a current play of the first wagering game on which the user wagered the second wager amount; current play reel set storage area 141*c*, which stores reel set data determined by the server and communicated to the user device that represents a reel set to be used in a current play of the first wagering game on which the user wagered the third wager amount; current play reel set storage area 141*d*, which stores reel set data determined by the server and communicated to the user device that represents a reel set to be used in a current play of the second wagering game on which the user wagered the first wager amount; current play reel set storage area 141*e*, which stores reel set data determined by the server and communicated to the user device that represents a reel set to be used in a current play of the second wagering game on which the user wagered the second wager amount; current play reel set storage area 141*f*, which stores reel set data determined by the server and communicated to the user device that represents a reel set to be used in a current play of the second wagering game on which the user wagered the third wager amount; current play reel set storage area 141g, which stores reel set data determined by the server and communicated to the user device that represents a reel set to be used in a current play of the third wagering game on which the user wagered the first wager amount; current play reel set storage area 141*h*, which stores reel set data determined by the server and communicated to the user device that represents a reel set to be used in a current play of the third wagering game on which the user wagered the second wager amount; and current play reel set storage area 141*i*, which stores reel set data determined by the server and communicated to the user device that represents a reel set to be used in a current play of the third wagering game on which the user wagered the third wager amount.

Similarly, next play reel set storage areas 136*b* include: next play reel set storage area 142*a*, which stores reel set data determined by the server and communicated to the user device that represents a reel set to be used in a next play of the first wagering game on which the user wagers the first wager amount; next play reel set storage area 142*b*, which stores reel set data determined by the server and communicated to the user device that represents a reel set to be used in a next play of the first wagering game on which the user wagers the second wager amount; next play reel set storage area 142*c*, which stores reel set data determined by the server and communicated to the user device that represents a reel set to be used in a next play of the first wagering game on which the user wagers the third wager amount; next play reel set storage area 142*d*, which stores reel set data determined by the server and communicated to the user device that represents a reel set to be used in a next play of the second wagering game on which the user wagers the first wager amount; next play reel set storage area 142*e*, which stores reel set data determined by the server and communicated to the user device that represents a reel set to be used in a next play of the second wagering game on which the user wagers the second wager amount; next play reel set storage area 142*f*, which stores reel set data determined by the server and communicated to the user device that represents a reel set to be used in a next play of the second wagering game on which the user wagers the third wager amount; next play reel set storage area 142*g*, which stores reel set data determined by the server and communicated to the user device that represents a reel set to be used in a next play of the third wagering game on which the user wagers the first wager amount; next play reel set storage area 142*h*, which stores reel set data determined by the server and communicated to the user device that represents a reel set to be used in a next play of the third wagering game on which the user wagers the second wager amount; and next play reel set storage area 142*i*, which stores reel set data determined by the server and communicated to the user device that represents a reel set to be used in a next play of the third wagering game on which the user wagers the third wager amount.

It should be appreciated that when the user initializes one or more of the wagering games, the user device communicates that initialization to the server and the server sends base reel set data representing the base reel set or base reel sets of those wagering games to the user device, which stores the base reel set data in the memory device accessible by the user device. That is, the server sends the reel sets for use in the first plays of each of the wagering games on which the player wagers each of the wager amounts. In this embodiment, for example, when the user loads a program on the user device that enables the player to play the first, second, and third wagering games, the server sends base reel set data representing the BASE 1, BASE 2, and BASE 3 reel sets, and the memory device stores that base reel set data. It should be appreciated that, in some embodiments, the base reel set data is stored on the user device, such as in on-chip CPU memory, in volatile computer memory, in non-volatile computer memory, on a hard drive, or a peripheral thereof, such as a USB drive, DVD, or CD, and thus is not retrieved from the server prior to game play. In certain other embodiments, the base reel set data is stored in a different user device and retrieved from that user device via peer to peer transfer.

FIG. 4A illustrates database 130 prior to the user having wagered any of the first, second, or third wager amounts on any plays of the first, second, or third wagering games. Since, in this example, the user has yet to play any of the first, second, or third wagering games, current play reel set storage areas 141*a* to 141*i* and next play reel set storage areas 142*a* to 142*i* do not store any reel set data.

In this example, the user wagers the first wager amount on a play of the first wagering game and initiates the current play of the first wagering game on the user device. In this example, since the user has not, prior to the current play of the first wagering game, wagered the first wager amount for a play of the first wagering game, the BASE 1 reel set is used for the current play of the first wagering game.

When the user initiates the current play of the first wagering game, the user device: (i) communicates with the sever and indicates that the user has wagered the first wager amount and initiated a play of the first wagering game, and (ii) displays the reels of the BASE 1 reel set spinning based on the base reel set data representing the BASE 1 reel set. Because the base reel set data representing the BASE 1 reel set was stored in the memory device prior to the initiation of the current play of the first wagering game, it should be appreciated that there is no appreciable delay between the time the user initiates the current play of the first wagering game and the time the user device displays the reels of the BASE 1 reel set spinning. As illustrated in FIG. 4B, in this example the server determines, in any suitable manner (such as randomly or via a weighted probability table), the ALTERNATE 1A reel set for use in the next play of the first wagering game on which the user wagers the first wager amount. The server also determines, in any suitable manner (such as randomly or via a weighted probability table), an outcome for the current play of the first wagering game. The server communicates reel set data representing the ALTERNATE 1A reel set and outcome data representing the determined outcome to the user device. The user device stores the received reel set data in database 130 and stores the received outcome data in the memory device. More specifically, the user device stores the received reel set data representing the ALTERNATE 1A reel set 152*a* in next play reel set storage area 142*a* because it is the reel set to be used in the next play of the first wagering game on which the user wagers the first wager amount. Since the BASE 1 reel set is the reel set being used in the current play of the first wagering game, the user device stores the base reel set data representing the BASE 1 reel set 151*a* in current play reel set storage area 141*a*. The user device stops the spinning reels in accordance with the determined outcome based on the outcome data.

Prior to any awards being provided to the user for the current play of the first wagering game, the server validates the reel set used in the current play of the first wagering game and the displayed symbols for security purposes. Specifically, in this example, the user device communicates to the server which reel set was used for the current play of the first wagering game and which symbols on the reels of that reel set were displayed after those reels stopped spinning. The server determines whether the reel set used in the current play of the first wagering game matches the BASE 1 reel set and whether the symbols displayed after the reels stopped spinning are in accordance with the determined outcome. If so, the user is provided with any awards associated with the displayed symbols and the current play of the first wagering game ends. If not, the server determines that the current play of the first wagering game may have been tampered with, no awards are provided to the user for the current play of the first wagering game, and the current play of the first wagering game ends. After completion of the current play of the first wagering game, the base reel set data representing the BASE 1 reel set 151*a* is removed from current play reel set storage area 141*a* (as shown in FIG. 4C).

It should be appreciated that, in some embodiments, when the server determines that the reel set used in the current play of the first wagering game does not match the reel does not match the BASE 1 reel set and/or the displayed symbols are not in accordance with the determined outcome for the current play of the first wagering game, the server does not enable the user to continue playing the first wagering game or, in some embodiments, any of the wagering games.

After completion of that play of the first wagering game, the user wagers the second wager amount on a play of the third wagering game and initiates the current play of the third wagering game on the user device. In this example, since the user has not, prior to the current play of the third wagering game, wagered the second wager amount for a play of the third wagering game, the BASE 3 reel set is used for the current play of the third wagering game.

When the user initiates the current play of the third wagering game, the user device: (i) communicates with the sever and indicates that the user has wagered the second wager amount and initiated a play of the third wagering game, and (ii) displays the reels of the BASE 3 reel set spinning based on the base reel set data representing the BASE 3 reel set. Because the base reel set data representing the BASE 3 reel set was stored in the memory device prior to the initiation of the current play of the third wagering game, it should be appreciated that there is no appreciable delay between the time the user initiates the current play of the third wagering game and the time the user device displays the reels of the BASE 3 reel set spinning. As illustrated in FIG. 4C, in this example the server determines the ALTERNATE 3A reel set for use in the next play of the third wagering game on which the user wagers the second wager amount. The server also determines an outcome for the current play of the third wagering game. The server communicates reel set data representing the ALTERNATE 3A reel set and outcome data representing the determined outcome to the user device. The user device stores the received reel set data in database 130 and stores the received outcome data in the memory device. More specifically, the user device stores the received reel set data representing the ALTERNATE 3A reel set 152*h* in next play reel set storage area 142*h* because it is the reel set to be used in the next play of the third wagering game on which the user wagers the second wager amount. Since the BASE 3 reel set is the reel set being used in the current play of the third wagering game, the user device stores the base reel set data representing the BASE 3 reel set 151*h* in current play reel set storage area 141*h*. The user device stops the spinning reels in accordance with the determined outcome based on the outcome data.

Prior to any awards being provided to the user for the current play of the third wagering game, the server validates the reel set used in the current play of the third wagering game and the displayed symbols for security purposes. Specifically, in this example, the user device communicates to the server which reel set was used for the current play of the third wagering game and which symbols on the reels of that reel set were displayed after those reels stopped spinning. The server determines whether the reel set used in the current play of the third wagering game matches the BASE 3 reel set and whether the symbols displayed after the reels stopped spinning are in accordance with the determined outcome. If so, the user is provided with any awards associated with the displayed symbols and the current play of the third wagering game ends. If not, the server determines that the current play of the third wagering game may have been tampered with, no awards are provided to the user for the current play of the third wagering game, and the current play of the third wagering game ends. After completion of the current play of the third wagering game, the base reel set data representing the BASE 3 reel set 151*h* is removed from current play reel set storage area 141*h* (as shown in FIG. 4D).

It should be appreciated that, in some embodiments, when the server determines that the reel set used in the current play of the third wagering game does not match the reel does not match the BASE 3 reel set and/or the displayed symbols are not in accordance with the determined outcome for the current play of the third wagering game, the server does not enable the user to continue playing the third wagering game or, in some embodiments, any of the wagering games.

After completion of that play of the third wagering game, the user wagers the third wager amount on a play of the first wagering game and initiates the current play of the first wagering game on the user device. In this example, since the user has not, prior to the current play of the first wagering game, wagered the third wager amount for a play of the first wagering game, the BASE 1 reel set is used for the current play of the first wagering game.

When the user initiates the current play of the first wagering game, the user device: (i) communicates with the sever and indicates that the user has wagered the third wager amount and initiated a play of the first wagering game, and (ii) displays the reels of the BASE 1 reel set spinning based on the base reel set data representing the BASE 1 reel set. Because the base reel set data representing the BASE 1 reel set was stored in the memory device prior to the initiation of the current play of the first wagering game, it should be appreciated that there is no appreciable delay between the time the user initiates the current play of the first wagering game and the time the user device displays the reels of the BASE 1 reel set spinning. As illustrated in FIG. 4D, in this example the server determines the ALTERNATE 1B reel set for use in the next play of the first wagering game on which the user wagers the third wager amount. The server also determines an outcome for the current play of the first wagering game. The server communicates reel set data representing the ALTERNATE 1B reel set and outcome data representing the determined outcome to the user device. The user device stores the received reel set data in database 130 and stores the received outcome data in the memory device. More specifically, the user device stores the received reel set data representing the ALTERNATE 1B reel set 152*c* in next play reel set storage area 142*c* because it is the reel set to be used in the next play of the first wagering game on which the user wagers the third wager amount. Since the BASE 1 reel set is the reel set being used in the current play of the first wagering game, the user device stores the base reel set data representing the BASE 1 reel set 151*c* in current play reel set storage area 141*c*. The user device stops the spinning reels in accordance with the determined outcome based on the outcome data.

Prior to any awards being provided to the user for the current play of the first wagering game, the server validates the reel set used in the current play of the first wagering game and the displayed symbols for security purposes. Specifically, in this example, the user device communicates to the server which reel set was used for the current play of the first wagering game and which symbols on the reels of that reel set were displayed after those reels stopped spinning. The server determines whether the reel set used in the current play of the first wagering game matches the BASE 1 reel set and whether the symbols displayed after the reels stopped spinning are in accordance with the determined outcome. If so, the user is provided with any awards associated with the displayed symbols and the current play of the first wagering game ends. If not, the server determines that the current play of the first wagering game may have been tampered with, no awards are provided to the user for the current play of the first wagering game, and the current play of the first wagering game ends. After completion of the current play of the first wagering game, the base reel set data representing the BASE 1 reel set 151*c* is removed from current play reel set storage area 141*c* (as shown in FIG. 4E).

It should be appreciated that, in some embodiments, when the server determines that the reel set used in the current play of the first wagering game does not match the reel does not match the BASE 1 reel set and/or the displayed symbols are not in accordance with the determined outcome for the current play of the first wagering game, the server does not enable the user to continue playing the first wagering game or, in some embodiments, any of the wagering games.

After completion of that play of the first wagering game, the user wagers the third wager amount on another play of the first wagering game and initiates the current play of the first wagering game on the user device. Since the user has, prior to the current play of the first wagering game, wagered the third wager amount on a play of the first wagering game, database 130 already stores reel set data representing the reel set to be used by the user device for the current play of the first wagering game. Specifically, the reel set determined by the server and represented by the reel set data sent to the user device and stored in database 130 during the previous play of the first wagering game on which the user wagered the third wager amount is used in the current play of the first wagering game. In this example, the ALTERNATE 1B reel set 152*c*, which was determined by the server during the previous play of the first wagering game on which the user wagered the third wager amount and is represented by reel set data stored by the memory device in next play reel set storage area 142*c*, is the reel set used for the current play of the first wagering game. Accordingly, the reel set data representing the ALTERNATE 1B reel set 152*c* is transferred from next play reel set storage area 142*c* to current play reel set storage area 141*c*, as illustrated in FIG. 4E.

When the user initiates the current play of the first wagering game, the user device: (i) communicates with the sever and indicates that the user has wagered the third wager amount and initiated another play of the first wagering game, and (ii) displays the reels of the ALTERNATE 1B reel set spinning based on the reel set data representing the ALTERNATE 1B reel set. Because the reel set data representing the ALTERNATE 1B reel set was stored in the memory device prior to the initiation of the current play of the first wagering game, it should be appreciated that there is no appreciable delay between the time the user initiates the current play of the first wagering game and the time the user device displays the reels of the ALTERNATE 1B reel set spinning. As illustrated in FIG. 4E, in this example the server determines the ALTERNATE 1A reel set for use in the next play of the first wagering game on which the user wagers the third wager amount. The server also determines an outcome for the current play of the first wagering game. The server communicates reel set data representing the ALTERNATE 1A reel set and outcome data representing the determined outcome to the user device. The user device stores the received reel set data in database 130 and stores the received outcome data in the memory device. More specifically, the user device stores the received reel set data representing the ALTERNATE 1A reel set 153*c* in next play reel set storage area 142*c* because it is the reel set to be used in the next play of the first wagering game on which the user wagers the third wager amount. The user device stops the spinning reels in accordance with the determined outcome based on the outcome data.

Prior to any awards being provided to the user for the current play of the first wagering game, the server validates the reel set used in the current play of the first wagering game and the displayed symbols for security purposes. Specifically, in this example, the user device communicates to the server which reel set was used for the current play of the first wagering game and which symbols on the reels of that reel set were displayed after those reels stopped spinning. The server determines whether the reel set used in the current play of the first wagering game matches the ALTERNATE 1B reel set and whether the symbols displayed after the reels stopped spinning are in accordance with the determined outcome. If so, the user is provided with any awards associated with the displayed symbols and the current play of the first wagering game ends. If not, the server determines that the current play of the first wagering game may have been tampered with, no awards are provided to the user for the current play of the first wagering game, and the current play of the first wagering game ends. After completion of the current play of the first wagering game, the reel set data representing the ALTERNATE 1B reel set 152*c* is removed from current play reel set storage area 141*c* (as shown in FIG. 4F).

It should be appreciated that, in some embodiments, when the server determines that the reel set used in the current play of the first wagering game does not match the reel does not match the ALTERNATE 1B reel set and/or the displayed symbols are not in accordance with the determined outcome for the current play of the first wagering game, the server does not enable the user to continue playing the first wagering game or, in some embodiments, any of the wagering games.

After completion of that play of the first wagering game, the user wagers the third wager amount on a play of the second wagering game and initiates the current play of the second wagering game on the user device. In this example, since the user has not, prior to the current play of the second wagering game, wagered the third wager amount for a play of the second wagering game, the BASE 2 reel set is used for the current play of the second wagering game.

When the user initiates the current play of the second wagering game, the user device: (i) communicates with the sever and indicates that the user has wagered the third wager amount and initiated a play of the second wagering game, and (ii) displays the reels of the BASE 2 reel set spinning based on the base reel set data representing the BASE 2 reel set. Because the base reel set data representing the BASE 2 reel set was stored in the memory device prior to the initiation of the current play of the second wagering game, it should be appreciated that there is no appreciable delay between the time the user initiates the current play of the second wagering game and the time the user device displays the reels of the BASE 2 reel set spinning. As illustrated in FIG. 4F, in this example the server determines the ALTERNATE 2C reel set for use in the next play of the second wagering game on which the user wagers the third wager amount. The server also determines an outcome for the current play of the second wagering game. The server communicates reel set data representing the ALTERNATE 2C reel set and outcome data representing the determined outcome to the user device. The user device stores the received reel set data in database 130 and stores the received outcome data in the memory device. More specifically, the user device stores the received reel set data representing the ALTERNATE 2C reel set 152*f* in next play reel set storage area 142*f* because it is the reel set to be used in the next play of the second wagering game on which the user wagers the third wager amount. Since the BASE 2 reel set is the reel set being used in the current play of the second wagering game, the user device stores the base reel set data representing the BASE 2 reel set 151*f* in current play reel set storage area 141*f*. The user device stops the spinning reels in accordance with the determined outcome based on the outcome data.

Prior to any awards being provided to the user for the current play of the second wagering game, the server validates the reel set used in the current play of the second wagering game and the displayed symbols for security purposes. Specifically, in this example, the user device communicates to the server which reel set was used for the current play of the second wagering game and which symbols on the reels of that reel set were displayed after those reels stopped spinning. The server determines whether the reel set used in the current play of the second wagering game matches the BASE 2 reel set and whether the symbols displayed after the reels stopped spinning are in accordance with the determined outcome. If so, the user is provided with any awards associated with the displayed symbols and the current play of the second wagering game ends. If not, the server determines that the current play of the second wagering game may have been tampered with, no awards are provided to the user for the current play of the second wagering game, and the current play of the second wagering game ends. After completion of the current play of the second wagering game, the base reel set data representing the BASE 2 reel set 151*f* is removed from current play reel set storage area 141*f* (as shown in FIG. 4G).

It should be appreciated that, in some embodiments, when the server determines that the reel set used in the current play of the second wagering game does not match the reel does not match the BASE 2 reel set and/or the displayed symbols are not in accordance with the determined outcome for the current play of the second wagering game, the server does not enable the user to continue playing the second wagering game or, in some embodiments, any of the wagering games.

After completion of that play of the second wagering game, the user wagers the second wager amount on another play of the third wagering game and initiates the current play of the third wagering game on the user device. Since the user has, prior to the current play of the third wagering game, wagered the second wager amount on a play of the third wagering game, database 130 already stores reel set data representing the reel set to be used by the user device for the current play of the third wagering game. Specifically, the reel set determined by the server and represented by the reel set data sent to the user device and stored in database 130 during the previous play of the third wagering game on which the user wagered the first wager amount is used in the current play of the third wagering game. In this example, the ALTERNATE 3A reel set 152*h*, which was determined by the server during the previous play of the third wagering game on which the user wagered the second wager amount and is represented by reel set data stored by the memory device in next play reel set storage area 142*h*, is the reel set used for the current play of the third wagering game. Accordingly, the reel set data representing the ALTERNATE 3A reel set 152*h* is transferred from next play reel set storage area 142*h* to current play reel set storage area 141*h*, as illustrated in FIG. 4G.

When the user initiates the current play of the third wagering game, the user device: (i) communicates with the sever and indicates that the user has wagered the second wager amount and initiated another play of the third wagering game, and (ii) displays the reels of the ALTERNATE 3A reel set spinning based on the reel set data representing the ALTERNATE 3A reel set. Because the reel set data representing the ALTERNATE 3A reel set was stored in the memory device prior to the initiation of the current play of the third wagering game, it should be appreciated that there is no appreciable delay between the time the user initiates the current play of the third wagering game and the time the user device displays the reels of the ALTERNATE 3A reel set spinning. As illustrated in FIG. 4G, in this example the server determines the ALTERNATE 3B reel set for use in the next play of the third wagering game on which the user wagers the second wager amount. The server also determines an outcome for the current play of the third wagering game. The server communicates reel set data representing the ALTERNATE 3B reel set and outcome data representing the determined outcome to the user device. The user device stores the received reel set data in database 130 and stores the received outcome data in the memory device. More specifically, the user device stores the received reel set data representing the ALTERNATE 3B reel set 153*h* in next play reel set storage area 142*h* because it is the reel set to be used in the next play of the third wagering game on which the user wagers the second wager amount. The user device stops the spinning reels in accordance with the determined outcome based on the outcome data.

Prior to any awards being provided to the user for the current play of the third wagering game, the server validates the reel set used in the current play of the third wagering game and the displayed symbols for security purposes. Specifically, in this example, the user device communicates to the server which reel set was used for the current play of the third wagering game and which symbols on the reels of that reel set were displayed after those reels stopped spinning. The server determines whether the reel set used in the current play of the third wagering game matches the ALTERNATE 3A reel set and whether the symbols displayed after the reels stopped spinning are in accordance with the determined outcome. If so, the user is provided with any awards associated with the displayed symbols and the current play of the third wagering game ends. If not, the server determines that the current play of the third wagering game may have been tampered with, no awards are provided to the user for the current play of the third wagering game, and the current play of the third wagering game ends. After completion of the current play of the third wagering game, the reel set data representing the ALTERNATE 3A reel set 152*h* is removed from current play reel set storage area 141*h* (as shown in FIG. 4H).

It should be appreciated that, in some embodiments, when the server determines that the reel set used in the current play of the third wagering game does not match the reel does not match the ALTERNATE 3A reel set and/or the displayed symbols are not in accordance with the determined outcome for the current play of the third wagering game, the server does not enable the user to continue playing the third wagering game or, in some embodiments, any of the wagering games.

After completion of that play of the third wagering game, the user wagers the third wager amount on a play of the third wagering game and initiates the current play of the third wagering game on the user device. In this example, since the user has not, prior to the current play of the third wagering game, wagered the third wager amount for a play of the third wagering game, the BASE 3 reel set is used for the current play of the third wagering game.

When the user initiates the current play of the third wagering game, the user device: (i) communicates with the sever and indicates that the user has wagered the third wager amount and initiated a play of the third wagering game, and (ii) displays the reels of the BASE 3 reel set spinning based on the base reel set data representing the BASE 3 reel set.

Because the base reel set data representing the BASE 3 reel set was stored in the memory device prior to the initiation of the current play of the third wagering game, it should be appreciated that there is no appreciable delay between the time the user initiates the current play of the third wagering game and the time the user device displays the reels of the BASE 3 reel set spinning. As illustrated in FIG. 4H, in this example the server determines the ALTERNATE 3A reel set for use in the next play of the third wagering game on which the user wagers the third wager amount. The server also determines an outcome for the current play of the third wagering game. The server communicates reel set data representing the ALTERNATE 3A reel set and outcome data representing the determined outcome to the user device. The user device stores the received reel set data in database 130 and stores the received outcome data in the memory device. More specifically, the user device stores the received reel set data representing the ALTERNATE 3A reel set 152*i* in next play reel set storage area 142*i* because it is the reel set to be used in the next play of the third wagering game on which the user wagers the third wager amount. Since the BASE 3 reel set is the reel set being used in the current play of the third wagering game, the user device stores the base reel set data representing the BASE 3 reel set 151*i* in current play reel set storage area 141*i*. The user device stops the spinning reels in accordance with the determined outcome based on the outcome data.

Prior to any awards being provided to the user for the current play of the third wagering game, the server validates the reel set used in the current play of the third wagering game and the displayed symbols for security purposes. Specifically, in this example, the user device communicates to the server which reel set was used for the current play of the third wagering game and which symbols on the reels of that reel set were displayed after those reels stopped spinning. The server determines whether the reel set used in the current play of the third wagering game matches the BASE 3 reel set and whether the symbols displayed after the reels stopped spinning are in accordance with the determined outcome. If so, the user is provided with any awards associated with the displayed symbols and the current play of the third wagering game ends. If not, the server determines that the current play of the third wagering game may have been tampered with, no awards are provided to the user for the current play of the third wagering game, and the current play of the third wagering game ends. After completion of the current play of the third wagering game, the base reel set data representing the BASE 3 reel set 151*i* is removed from current play reel set storage area 141*i* (as shown in FIG. 4I).

It should be appreciated that, in some embodiments, when the server determines that the reel set used in the current play of the third wagering game does not match the reel does not match the BASE 3 reel set and/or the displayed symbols are not in accordance with the determined outcome for the current play of the third wagering game, the server does not enable the user to continue playing the third wagering game or, in some embodiments, any of the wagering games.

After completion of that play of the third wagering game, the user wagers the first wager amount on a play of the second wagering game and initiates the current play of the second wagering game on the user device. In this example, since the user has not, prior to the current play of the second wagering game, wagered the first wager amount for a play of the second wagering game, the BASE 2 reel set is used for the current play of the second wagering game.

When the user initiates the current play of the second wagering game, the user device: (i) communicates with the sever and indicates that the user has wagered the first wager amount and initiated a play of the second wagering game, and (ii) displays the reels of the BASE 2 reel set spinning based on the base reel set data representing the BASE 2 reel set. Because the base reel set data representing the BASE 2 reel set was stored in the memory device prior to the initiation of the current play of the second wagering game, it should be appreciated that there is no appreciable delay between the time the user initiates the current play of the second wagering game and the time the user device displays the reels of the BASE 2 reel set spinning. As illustrated in FIG. 4I, in this example the server determines the ALTERNATE 2B reel set for use in the next play of the second wagering game on which the user wagers the first wager amount. The server also determines an outcome for the current play of the second wagering game. The server communicates reel set data representing the ALTERNATE 2B reel set and outcome data representing the determined outcome to the user device. The user device stores the received reel set data in database 130 and stores the received outcome data in the memory device. More specifically, the user device stores the received reel set data representing the ALTERNATE 2B reel set 152*d* in next play reel set storage area 142*d* because it is the reel set to be used in the next play of the second wagering game on which the user wagers the first wager amount. Since the BASE 2 reel set is the reel set being used in the current play of the second wagering game, the user device stores the base reel set data representing the BASE 2 reel set 151*d* in current play reel set storage area 141*d*. The user device stops the spinning reels in accordance with the determined outcome based on the outcome data.

Prior to any awards being provided to the user for the current play of the second wagering game, the server validates the reel set used in the current play of the second wagering game and the displayed symbols for security purposes. Specifically, in this example, the user device communicates to the server which reel set was used for the current play of the second wagering game and which symbols on the reels of that reel set were displayed after those reels stopped spinning. The server determines whether the reel set used in the current play of the second wagering game matches the BASE 2 reel set and whether the symbols displayed after the reels stopped spinning are in accordance with the determined outcome. If so, the user is provided with any awards associated with the displayed symbols and the current play of the second wagering game ends. If not, the server determines that the current play of the second wagering game may have been tampered with, no awards are provided to the user for the current play of the second wagering game, and the current play of the second wagering game ends. After completion of the current play of the second wagering game, the base reel set data representing the BASE 2 reel set 151*d* is removed from current play reel set storage area 141*d* (as shown in FIG. 4J).

It should be appreciated that, in some embodiments, when the server determines that the reel set used in the current play of the second wagering game does not match the reel does not match the BASE 2 reel set and/or the displayed symbols are not in accordance with the determined outcome for the current play of the second wagering game, the server does not enable the user to continue playing the second wagering game or, in some embodiments, any of the wagering games.

After completion of that play of the second wagering game, the user wagers the third wager amount on another play of the first wagering game and initiates the current play of the first wagering game on the user device. Since the user has, prior to the current play of the first wagering game, wagered the third wager amount on a play of the first wagering game, database 130 already stores reel set data representing the reel set to be used by the user device for the current play of the first wagering game. Specifically, the reel set determined by the server and represented by the reel set data sent to the user device and stored in database 130 during the previous play of the first wagering game on which the user wagered the third wager amount is used in the current play of the first wagering game. In this example, the ALTERNATE 1A reel set 153*c*, which was determined by the server during the previous play of the first wagering game on which the user wagered the third wager amount and is represented by reel set data stored by the memory device in next play reel set storage area 142*c*, is the reel set used for the current play of the third wagering game. Accordingly, the reel set data representing the ALTERNATE 1A reel set 153*c* is transferred from next play reel set storage area 142*c* to current play reel set storage area 141*c*, as illustrated in FIG. 4J.

When the user initiates the current play of the first wagering game, the user device: (i) communicates with the sever and indicates that the user has wagered the third wager amount and initiated another play of the first wagering game, and (ii) displays the reels of the ALTERNATE 1A reel set spinning based on the reel set data representing the ALTERNATE 1A reel set. Because the reel set data representing the ALTERNATE 1A reel set was stored in the memory device prior to the initiation of the current play of the first wagering game, it should be appreciated that there is no appreciable delay between the time the user initiates the current play of the first wagering game and the time the user device displays the reels of the ALTERNATE 1A reel set spinning. As illustrated in FIG. 4J, in this example the server determines the ALTERNATE 1C reel set for use in the next play of the first wagering game on which the user wagers the third wager amount. The server also determines an outcome for the current play of the first wagering game. The server communicates reel set data representing the ALTERNATE 1C reel set and outcome data representing the determined outcome to the user device. The user device stores the received reel set data in database 130 and stores the received outcome data in the memory device. More specifically, the user device stores the received reel set data representing the ALTERNATE 1C reel set 154*c* in next play reel set storage area 142*c* because it is the reel set to be used in the next play of the first wagering game on which the user wagers the third wager amount. The user device stops the spinning reels in accordance with the determined outcome based on the outcome data.

Prior to any awards being provided to the user for the current play of the first wagering game, the server validates the reel set used in the current play of the first wagering game and the displayed symbols for security purposes. Specifically, in this example, the user device communicates to the server which reel set was used for the current play of the first wagering game and which symbols on the reels of that reel set were displayed after those reels stopped spinning. The server determines whether the reel set used in the current play of the first wagering game matches the ALTERNATE 1A reel set and whether the symbols displayed after the reels stopped spinning are in accordance with the determined outcome. If so, the user is provided with any awards associated with the displayed symbols and the current play of the first wagering game ends. If not, the server determines that the current play of the first wagering game may have been tampered with, no awards are provided to the user for the current play of the first wagering game, and the current play of the first wagering game ends. After completion of the current play of the first wagering game, the reel set data representing the ALTERNATE 1A reel set 153*c* is removed from current play reel set storage area 141*c* (as shown in FIG. 4K).

It should be appreciated that, in some embodiments, when the server determines that the reel set used in the current play of the first wagering game does not match the reel does not match the ALTERNATE 1A reel set and/or the displayed symbols are not in accordance with the determined outcome for the current play of the first wagering game, the server does not enable the user to continue playing the first wagering game or, in some embodiments, any of the wagering games.

After completion of that play of the first wagering game, the user stops playing the wagering games and ends the user's interaction with the user device by, for example, logging out of the user device. In certain embodiments, the user device stores database 130 as shown in FIG. 4K in the memory device. The next time the user logs into the user device to play the first, second, and/or third wagering games by wagering the first, second, and/or third wager amounts, the user device loads database 130 and uses the reel set data stored in database 130 for any future plays of the first, second, and/or third wagering games on which the user wagers any of the first, second, and/or third wager amounts. In other embodiments, when the user logs out, the user device communicates database 130 to the server, which stores database 130 in a memory device accessible by the server. In these embodiments, when the user logs back in to the user device, the server communicates database 130 to the user device. It should be appreciated that, in each of these embodiments, database 130 and the reel set data included therein persists for the user from gaming session to gaming session without resetting or erasing. That is, reel set data received by the user device during one gaming session at a first point in time may be employed in plays of the wagering games that are played subsequently at a second point in time.

It should be appreciated from the above-described example that for each play of one of the wagering games on which the user wagers one of the wager amounts, there is no appreciable delay between the time the user initiates that play of that wagering game and the time the user device displays the reels used in that play of that wagering game spinning because the memory device accessible by the user device already stores data representing those reels. The user device does not wait for the server to send reel set data representing those reels to the user device during that play of the wagering game.

It should also be appreciated from the above-described example that the server validates the reels and the outcome displayed for each play of each wagering game to ensure that the displayed reels and the displayed outcome match the reel set and the outcome determined by the server for that play of that wagering game. This enables the server to determine whether the user (or other individual or entity) has hacked the client-server architecture and replaced, modified, or corrupted any of the data sent from the server to the user device or from the user device to the server.

Additionally, since the server of the present disclosure determines and sends an outcome for a play of a wagering game after a user places a wager and initiates that play of the wagering game, even if the user hacks the server, intercepts the data representing the outcome, and views the determined outcome, the player cannot use this information to the player's advantage because the player has already wagered on and initiated that play of the game.

The reel set data may include various types of data. In certain embodiments, the memory device accessible by the user device stores data representing the configuration of each reel of each of the wagering games (e.g., the symbols on the reels and the locations of those symbols relative to one another on the reels). In some embodiments, the server sends this data to the user device, and the user device stores the received data in the memory device, upon initialization of the user device (e.g., upon user login or loading of the application that enables the user to play the wagering games). In certain of these embodiments, a different identifier is associated with each of these sets of data representing the reel configurations. In these embodiments, the reel set data communicated by the server to the user device includes the identifiers of the reels to be used in the reel set of the play of the wagering game. The user device uses the received identifiers to retrieve the associated data from the memory device to display the play of the wagering game. It should therefore be appreciated that, in these embodiments, the server sends a relatively small amount of reel set data (i.e., the identifier(s)) to the user device.

In certain other embodiments, the memory device accessible by the user device does not store the data representing the configuration of each of the reels. In these embodiments, the server stores this data. The reel set data communicated by the server to the user device includes the data representing the configuration of each of the reels selected by the server to be used in the play of the wagering game. It should therefore be appreciated that, in these embodiments, the server sends a relatively large amount of reel set data (i.e., the configurations of each of the selected reels) to the user device.

In certain embodiments, the outcome determined by the server and sent to the user device for a play of one of the wagering games is an award amount rather than a set of symbols of each reel to display. In these embodiments, when the user device receives the award amount the user device determines which symbols on the reels to display that correspond to that award amount. Thus, in these embodiments, the user device determines which symbols to display on each reel rather than the server. It should be appreciated that the server may determine the outcome of the wagering games in any suitable manner.

In various embodiments, such as the one described above with respect to FIGS. 4A, 4B, 4C, 4D, 4E, 4F, 4G, 4H, 4I, 4J, and 4K, each spinning-reel type wagering game and wager amount combination is associated with an average expected payout percentage. In certain of these embodiments, the reel set used by the user device for the first play of each wagering game and wager amount combination is a reel set having an average expected payout percentage that is equal to or substantially equal to the average expected payout percentage for that wagering game and wager amount combination. For example, a combination of a first wagering game and a first wager amount is associated with an average expected payout percentage of 92%, while a combination of a second wagering game and a second wager amount is associated with an average expected payout percentage of 95%. In this example, the first time a user wagers the first wager amount for a play of the first wagering game (i.e., the first play of this wagering game and wager amount combination), the user device will use a reel set for that play of the first wagering game that has an average expected payout percentage to or substantially equal to 92%, and the first time the user wagers the second wager amount for a play of the second wagering game (i.e., the first play of this wagering game and wager amount combination), the user device will use a reel set for that play of the second wagering game that had an average expected payout percentage equal to or substantially equal to 95%. It should be appreciated that, in these embodiments, certain of the reels having average expected payout percentages that are significantly higher or lower than the average expected payout percentage of the applicable wagering game and wager amount combination may not be included in the reel set employed in the first play of that wagering game on which the user wagered that wager amount.

In an example of one of these embodiments, a wagering game having an average expected payout percentage equal to 93% also includes a reel set including having a plurality of stacked WILD symbols that has an average expected payout percentage in excess of 200%. In this example, the reel set used for the first play of that wagering game has an average expected payout percentage equal to or substantially equal to 93%, meaning that the reel set having the stacked WILD symbols may not be used for the first play of that wagering game. That reel set may, however, be employed in one or more subsequent plays of that wagering game.

In various other embodiments, the server determines which reel set the user device will use for the first play (and any subsequent plays) of each wagering game and wager amount combination. In these embodiments, when the user device indicates to the server that the user has wagered a certain wager amount on a play of a certain wagering game for the first time, the server determines a reel set for use in that first play of that wagering game and wager amount combination that has an average expected payout percentage equal to or substantially equal to the average expected payout percentage of that wagering game and wager amount combination and communicates reel set data representing that reel set to the user device. It should be appreciated that, as described above, the server also determines a reel set for use in the next play of that wagering game and wager amount combination and communicates that reel set to the user device for use in the next play of that wagering game and wager amount combination.

In some embodiments, for each wagering game and wager amount combination, the server stores reel set data representing a single reel set for use in the first play of that wagering game and wager amount combination. Thus, in these embodiments, the reel set for use in the first play of each wagering game and wager amount combination is predetermined, and the server communicates the reel set data representing the predetermined reel set associated with a given wagering game and wager amount combination to the user device (along with the reel set data representing the reel set for use in the next play of that wagering game and wager amount combination) when the user device indicates to the server that the user has initiated the first play of that wagering game and wager amount combination. In other embodiments, for each wagering game and wager amount combination, the server stores reel set data representing a plurality of reel sets each having an average expected payout percentage equal to or substantially equal to the average expected payout percentage of that wagering game and wager amount combination. In these embodiments, when the user device indicates to the server that the user has initiated the first play of one of the wagering game and wager amount combinations, the server selects one of the plurality of reel sets for use in the first play of that wagering game and wager amount combination and communicates the reel set data representing the selected reel set to the user device (along with the reel set data representing the reel set for use in the next play of that wagering game and wager amount combination). It should be appreciated that the server may select the reel set in any suitable manner.

In some of the embodiments in which the server determines the reel set for use in the first plays of the various wagering game and wager amount combinations, there may be an appreciable delay between the time the user device communicates the initiation of the play of the wagering game and wager amount combination to the server and the time the server communicates the reel set data representing the reel set for use in that play of the wagering game and wager amount combination (along with the reel set data representing the reel set for use in the next play of that wagering game and wager amount combination) back to the user device. That is, the first play of the wagering game and wager amount combination may be longer than one or more subsequent plays of that wagering game and wager amount combination.

In certain other embodiments, the user device determines which reel set the user device will use for the first play of each wagering game and wager amount combination rather than the server. In these embodiments, when the user device recognizes that the user has wagered a certain wager amount on a play of a certain wagering game for the first time, the user device determines a reel set for use in that first play of the wagering game and wager amount combination that has an average expected payout percentage that is equal to or substantially equal to the average expected payout percentage of the wagering game and wager amount combination.

In some of these embodiments, such as the one described above with respect to FIGS. 4A, 4B, 4C, 4D, 4E, 4F, 4G, 4H, 4I, 4J, and 4K, for each wagering game and wager amount combination, a memory device accessible by the user device stores reel set data representing a single reel set for use in the first play of that wagering game and wager amount combination. Thus, in these embodiments, the reel set data representing the reel set for use in the first play of each wagering game and wager amount combination is predetermined, and the user device retrieves the reel set data representing the predetermined reel set associated with a given wagering game and wager amount combination from the memory device when the user initiates the first play of that wagering game and wager amount combination. In other embodiments, for each wagering game and wager amount combination, the memory device stores reel set data representing a plurality of reel sets each having an average expected payout percentage equal to or substantially equal to the average expected payout percentage of that wagering game and wager amount combination. In these embodiments, when the user initiates the first play of a wagering game and wager amount combination, the user device selects one of the plurality of reel sets for use in the first play of that wagering game and wager amount combination. It should be appreciated that the user device may select the reel set in any suitable manner.

Since, in these embodiments, the user device itself determines the reel set for use in the first play of a given wagering game and wager amount combination and does not wait to receive reel set data from the server, and it should be appreciated that the first play of the wagering game and wager amount combination in these embodiments is not appreciably longer than any subsequent plays. In other words, since the memory accessible by the user device already stores the potential reel sets for use in the first plays of each of the wagering game and wager amount combinations, there is no appreciable delay between the time the user initiates a first play of one of the wagering game and wager amount combinations and the time the user device displays the reels used in that first play.

It should be appreciated that in certain embodiments in which the reel set used in the first play of a given wagering game and wager amount combination is predetermined, determined by the user device, or determined by the processor, that reel set may have any suitable average expected payout percentage.

In some embodiments, rather than storing reel set data for each wagering game and each wager amount, the memory device stores the wager amount most recently wagered on one of the wagering games and reel set data representing the reel set received from the server for use in the next play of that wagering game on which the user wagers that wager amount. In these embodiments, the user device compares the next-placed wager amount and the wagering game on which that wager amount is wagered with the previously-placed wager amount that was wagered on the previously-played wagering game. If the current wager amount and wagering game match the previous wager amount and wagering game, the user device displays the reels represented by that reel set data to the player, receives an outcome from the sever as described above, and stops the reels in accordance with that outcome. If the current wagering game and the previous wagering game differ, or if the current wager amount and the previous wager amount differ, and if the reel set represented by that reel set data has an average expected payout percentage that is at or below the average expected payout percentage of the wagering game, the user device displays the reels represented by that reel set data to the player, receives an outcome from the sever as described above, and stops the reels in accordance with that outcome. If the current wagering game and the previous wagering game differ, or if the current wager amount and the previous wager amount differ, and if the reel set represented by that reel set data has an average expected payout percentage that is greater than the average expected payout percentage of the wagering game, the user device displays a reel set having an average expected payout percentage that is substantially equal to the average expected payout percentage of the wagering game, receives an outcome from the sever as described above, and stops the reels in accordance with that outcome.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A user device comprising:

at least one processor;

at least one display device; and at least one memory device storing a plurality of instructions which, when executed by the at least one processor, cause the at least one processor to operate with the at least one display device to, for a user:

(a) for a first play of a game starting at a first point in time and employing a stored first reel set:

(i)receive, from a remote controller:

(A) second reel set data representing a second reel set for use in a second subsequent play of the game to start at a second subsequent point in time, and (B) first outcome data representing a first outcome associated with the first reel set for the first play of the game;

(ii) store the second reel set data and the first outcome data; and (iii) after receiving and storing the second reel set data and the first outcome data, display the first outcome; and (b) for the second play of the game starting at the second point in time, after receiving the second reel set data and the first outcome data:

(i) receive, from the remote controller:

(A) second outcome data representing a second outcome associated with the second reel set for the second play of the game, and (B) third reel set data representing a third reel set for use in a third subsequent play of the game to start at a third subsequent point in time;

(ii) store the third reel set data and the second outcome data; and (iii) after receiving and storing the third reel set data and the second outcome data, display the second outcome.

2. The user device of claim 1, wherein the plurality of instructions, when executed by the at least one processor, cause the at least one processor to execute (a) and (b) for a first amount wagered.

3. The user device of claim 1, wherein the plurality of instructions, when executed by the at least one processor, cause the at least one processor to identify the user.

4. The user device of claim 1, wherein each of the reel sets includes at least one of a plurality of reels.

5. The user device of claim 1, wherein the plurality of instructions, when executed by the at least one processor, cause the at least one processor to store the second reel set data and the third reel set data in the at least one memory device.

6. A user device comprising:

at least one processor;

at least one display device; and at least one memory device storing a plurality of instructions which, when executed by the at least one processor, cause the at least one processor to operate with the at least one display device to, for a user, for each play of a game, said play of the game employing a stored reel set previously received from a remote controller:

(a) receive, from the remote controller:

(i) outcome data representing an outcome associated with said stored reel set for said play of the game, and (ii) second reel set data representing a second reel set for use in a second play of the game to start subsequent to the start of said play of the game;

(b) store the outcome data and the second reel set data; and (c) after receiving and storing the outcome data and the second reel set data, display said outcome.

7. The user device of claim 6, wherein the plurality of instructions, when executed by the at least one processor, cause the at least one processor to execute (a) and (b) for a first amount wagered.

8. The user device of claim 6, wherein the plurality of instructions, when executed by the at least one processor, cause the at least one processor to identify the user.

9. The user device of claim 6, wherein each of the reel sets includes at least one of a plurality of reels.

10. The user device of claim 6, wherein the plurality of instructions, when executed by the at least one processor, cause the at least one processor to store the second reel set data in the at least one memory device.

11. A method of operating a gaming system, said method comprising, for a user:

(a) for a first play of a game starting at a first point in time and employing a stored first reel set:

(i) causing at least one processor to execute a plurality of instructions stored in at least one memory device to receive, from a remote controller:

(A) second reel set data representing a second reel set for use in a second subsequent play of the game to start at a second subsequent point in time, and (B) first outcome data representing a first outcome associated with the first reel set for the first play of the game;

(ii) causing the at least one processor to execute the plurality of instructions to store the second reel set data and the first outcome data; and (iii) after receiving and storing the second reel set data and the first outcome data, causing the at least one processor to execute the plurality of instructions to operate with at least one display device to display the first outcome; and (b) for the second play of the game starting at the second point in time, after receiving the second reel set data and the first outcome data:

(i)causing the at least one processor to execute the plurality of instructions to receive, from the remote controller:

(A) second outcome data representing a second outcome associated with the second reel set for the second play of the game, and (B) third reel set data representing a third reel set for use in a third subsequent play of the game to start at a third subsequent point in time;

(ii) causing the at least one processor to execute the plurality of instructions to store the third reel set data and the second outcome data; and (iii) after receiving and storing the third reel set data and the second outcome data, causing the at least one processor to execute the plurality of instructions to operate with the at least one display device to display the second outcome.

12. The method of claim 11, which includes providing (a) and (b) for a first amount wagered.

13. The method of claim 11, which includes causing the at least one processor to execute the plurality of instructions to identify the user.

14. The method of claim 11, wherein each of the reel sets includes at least one of a plurality of reels.

15. The method of claim 11, which includes causing the at least one processor to execute the plurality of instructions to store the second reel set data and the third reel set data in the at least one memory device.

16. The method of claim 11, which is provided through a data network.

17. The method of claim 16, wherein the data network is the internet.

18. A method of operating a gaming system, said method comprising:

for a user, for each play of a game, said play of the game employing a stored reel set previously received from a remote controller:

(a) causing at least one processor to execute a plurality of instructions stored in at least one memory device to receive, from the remote controller:

(i)outcome data representing an outcome associated with the stored reel set for said play of the game, and (ii) second reel set data representing a second reel set for use in a second play of the game to start subsequent to the start of said play of the game;

(b) causing the at least one processor to execute the plurality of instructions to store the outcome data and the second reel set data; and (c) after receiving and storing the outcome data and the second reel set data, causing the at least one processor to execute the plurality of instructions to operate with at least one display device to display said outcome.

19. The method of claim 18, which includes providing (a) and (b) for a first amount wagered.

20. The method of claim 18, which includes causing the at least one processor to execute the plurality of instructions to identify the user.

21. The method of claim 18, wherein each of the reel sets includes at least one of a plurality of reels.

22. The method of claim 18, which includes causing the at least one processor to execute the plurality of instructions to store the second reel set data in the at least one memory device.

23. The method of claim 18, which is provided through a data network.

24. The method of claim 23, wherein the data network is the internet.

* * * * *